United States Patent [19]

Cichelli et al.

[11] 4,290,105

[45] Sep. 15, 1981

[54] METHOD AND APPARATUS FOR TESTING MEMBERSHIP IN A SET THROUGH HASH CODING WITH ALLOWABLE ERRORS

[75] Inventors: Richard J. Cichelli, Allentown; Michael Q. Thompson, Bethlehem; William R. Cheswick, New Hope, all of Pa.

[73] Assignee: American Newspaper Publishers Association, Easton, Pa.

[21] Appl. No.: 26,114

[22] Filed: Apr. 2, 1979

[51] Int. Cl.³ .............................................. G06F 7/00
[52] U.S. Cl. .................................. 364/200; 364/900
[58] Field of Search ............... 364/200, 900, 518, 523; 340/146.3 ED, 146.3 WD

[56] References Cited

U.S. PATENT DOCUMENTS

| | | | |
|---|---|---|---|
| 3,259,883 | 7/1966 | Rabinow et al. | 340/146.3 WD |
| 3,568,156 | 3/1971 | Thompson | 364/900 |
| 3,651,459 | 3/1972 | Hahn | 340/146.3 WD |
| 3,855,576 | 12/1974 | Braun et al. | 340/146.2 |
| 3,925,761 | 12/1975 | Chaires et al. | 340/146.3 WD |
| 3,947,825 | 3/1976 | Cassada | 364/900 |
| 3,969,698 | 7/1976 | Bollinger et al. | 340/146.3 WD |
| 3,995,254 | 11/1976 | Rosenbaum | 340/146.3 WD |
| 4,010,445 | 3/1977 | Hoshino | 340/146.3 WD |
| 4,034,194 | 7/1977 | Thomas et al. | 371/20 |
| 4,053,871 | 10/1977 | Vidalin et al. | 340/146.2 |
| 4,058,795 | 11/1977 | Balm | 340/146.3 WD |
| 4,058,851 | 11/1977 | Scheuneman | 364/900 |
| 4,136,395 | 1/1979 | Kolpek et al. | 364/518 |
| 4,149,262 | 4/1979 | Lamb et al. | 364/900 |
| 4,157,586 | 6/1979 | Gannon et al. | 364/200 |
| 4,157,587 | 6/1979 | Joyce et al. | 364/200 |
| 4,164,025 | 8/1979 | Dubnowski et al. | 364/900 |
| 4,187,551 | 2/1980 | Nutter et al. | 364/900 |

OTHER PUBLICATIONS

Riseman and Hanson, A Contextual Postprocessing System for Error Correction Using Binary n-Grams, IEEE Trans. on Computers, vol. C-23, No. 5, May 1974, pp. 480-493.
Ascher, et al., An Interactive System for Reading Unformatted Printed Text, IEEE Transaction on Computers, vol. C-20, No. 12, Dec. 1971, pp. 1527-1543.
Bloom, Space/Time Trade-Offs in Hash Coding with Allowable Errors, Communication of the ACM, vol. 13, No. 7, Jul. 1970, pp. 422-426.

*Primary Examiner*—Charles E. Atkinson
*Attorney, Agent, or Firm*—David H. Semmes; Warren E. Olsen

[57] ABSTRACT

A machine-implemented process, and apparatus, for performing a set membership test on large sets through the technique of binary hash coding with a known allowable expectation of an error. The present invention does not employ content addressable memory; rather, the present invention performs set membership testing by utilizing a hash function, which produces a randomized plurality of simple address locations within a bulk memory, for each item in the set. A testing for membership comprises employing a logical AND operation upon all values of binary indicators at memory locations addressed by hash values of a test item, to determine whether each and every hash value generated for the test item exactly matches with previously loaded indicators at those address locations in the bulk memory, which in the pereferred embodiment is of the CCD type. The present invention is a machine-implemented process, and employs a known algorithm as part of the overall process. The present invention also essentially comprises the synergistic interaction of a hardware item called a "hash board", and a bulk memory. The hash board generates a large number of hash addresses for any given item, using minimal computation time. The expected error rate is a function of the vocabulary size and the total number of indicators in the bulk memory. The bulk memory allows a low error rate for large vocabularies without exceeding the statistically ideal loading density of 50 percent. The hashing technique, together with its hardware implementation, allows a black box approach to general set membership testing. Information stored in the bulk memory can be said to be encrypted because the randomizing process makes it impossible to retrieve the original set of items. A preferred embodiment of the machine-implemented process, and apparatus is for on-line spelling checking of each word which appears in daily newspaper production, against a selective 20,000-word vocabulary, previously stored as a randomized set of simple bit addresses.

15 Claims, 15 Drawing Figures

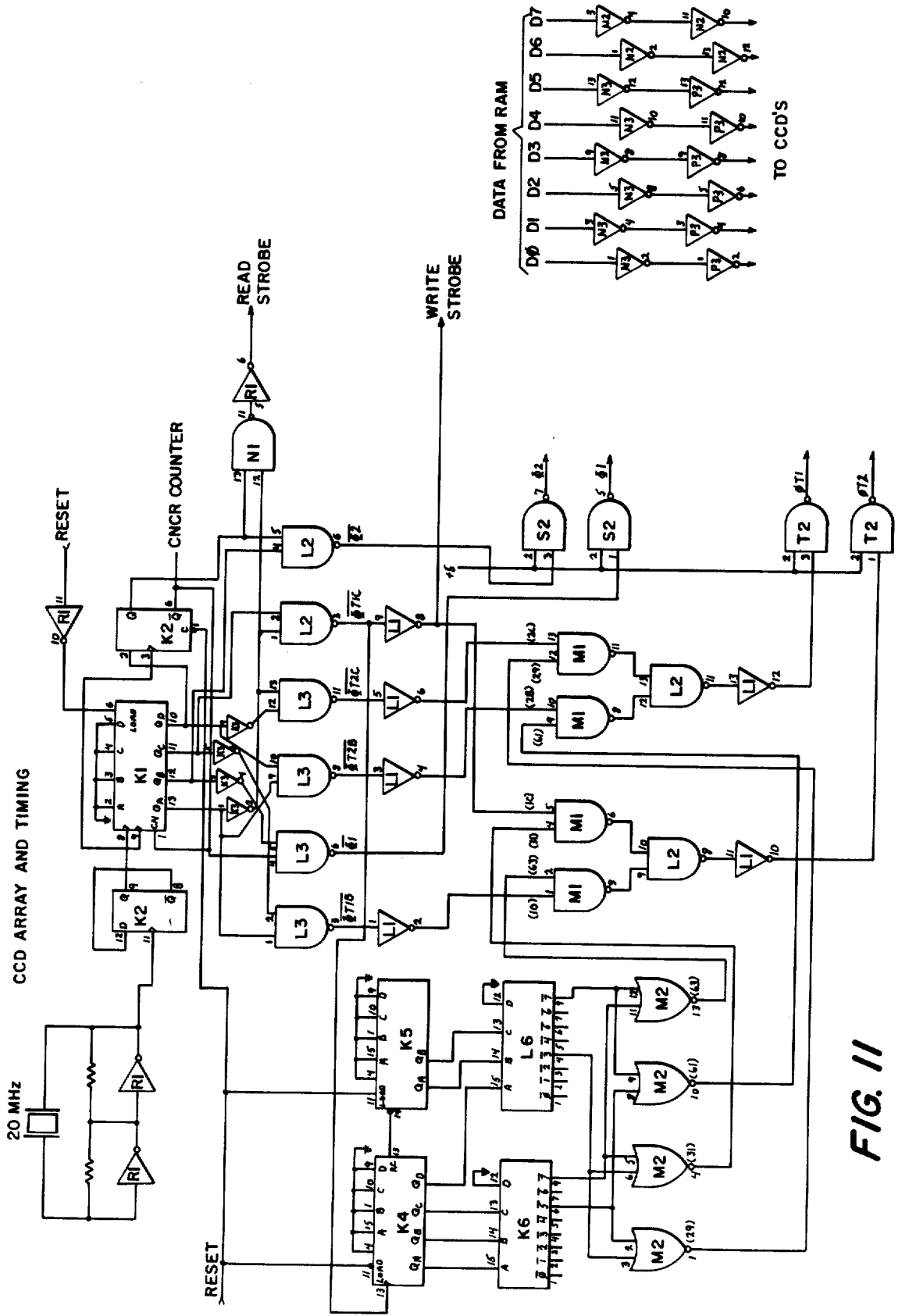
FIG. II

METHOD AND APPARATUS FOR TESTING MEMBERSHIP IN A SET THROUGH HASH CODING WITH ALLOWABLE ERRORS

BACKGROUND OF THE INVENTION

This invention is a particularly efficient method, and hardware apparatus, for testing membership of an item in a large set. A set is a collection of items. A set membership test is an operation upon a given item and a set. The operation is a predicate function which returns the value "true" if the item is a member of the set and "false" otherwise. The present invention is a particularly efficient device for testing membership in a set and has been reduced to practice with a set which consists of most frequently occurring English words. However, it should be understood that the present invention is not limited to testing membership of a word in a given set of words, but has an infinite potential for testing whether any given item is a member of any given set.

Content addressable memory is a special memory hardware device which allows access to data items not only by location, in the manner of traditional memories, but also by the contents or value of a table item. In this manner content addressable memory performs a parallel search through all available memory to find all matches. In contrast, this invention performs a set membership test by utilizing a pseudo content addressable function based on hashing.

The present invention comprises both software and hardware elements and may be conveniently identified by the name "Micromark". The Micromark system, or Micromark, is essentially a device for testing membership in a set, which is particularly efficient because it employs a very efficient piece of hardware called a hash board, and an efficient and inexpensive form of memory, to interact with this hash board. Micromark, therefore, is a general purpose list matcher and comparer, embodied in hardware which allows any membership question to be answered, very efficiently. Micromark performs this function with a process, which is also considered unique, in that the conceptual approach of the present invention is not considered known in the prior art.

At this point, applicants not that there is a basic algorithm involved here, and this aalgorithm forms one principle upon which the Micromark system is based. The "algorithm" is per se known in the prior art, since a mathematical analysis of binary hash coding, with allowable errors, was discussed in a 1970 article by Mr. Burton H. Bloom. Nevertheless, the present approach is not strictly a mathematical exercise, insofar as there is truly no algorithm that is meant to be preempted. This procedure is not equivalent to an algorithm for set membership testing in that the procedure yields answers with a small finite known probability of error.

The procedure might more properly be called a "HEURISTIC" (i.e., a rule of thumb) for determining set membership.

The preferred embodiment of the present invention is illustrated as a spelling-checking technique, where it is not necessary to be able to recall words from a memory device. Rather, it is only necessary to know whether or not a particular word is a member of a set, i.e., whether a particular word is spelled in the same manner as any word is spelled within the set. To further illuminate the background of the preferred embodiment, applicants will now discuss prior art types of spelling-checking devices, and particularly those wherein a vocabulary of words are matched to a word under scrutiny in a straight content-type and addressable lookup manner.

In modern editorial/composition systems, text is stored on disks or other mass storage devices. Programmers view text as a sequence of characters. For spelling-checking, it is necessary to organize the characters into words. Let us assume that we have a procedure which will tell us if a given word is correctly spelled. We could call this routine TESTSP (TEST SPelling). Given a character sequence of string, TESTSP would test the string and would yield the result, "YES", if the word is okay, or "NO", if the word is erroneous.

A program which proofs spelling and uses a TESTSP routine would read the sequence of characters that comprises a story or article. It would then break this sequence into a series of words and, for each word, would invoke TESTSP. If the TESTSP returned "NO" for a word, the proofing program would mark the word for later revision. The result of this process would be a new story file with error words specially denoted. With an interactive system, editors could correct marked error words on a VDT. Interactive spelling-proofing could be an integral part of an on-line test editing procedure.

THE NATURE OF SPELLING-CHECKING IN A NEWSPAPER ENVIRONMENT

One sees typographical and spelling errors in newspapers every day. With the advent of computerized editorial/composition systems, fewer opportunities for the introduction of such errors occur after news copy leaves the newsroom. Coincidentally, fewer opportunities for error detection and correction in the composing room exist. For good or ill, it is likely that what an editor sees on his VDT screen is what he will get printed in the newspaper. Automated aids for proofing would help newsroom personnel to increase the quality of the newspaper. Micromark is a first step in the quest for such proofing aids.

There are many possible ways to implement the checking function of TESTSP. The temptation is to take an oversimplified view of how TESTSP might work. It could be implemented by storing a copy of all of the words in Webster's Collegiate Dictionary and, for each test word, look the word up in the dictionary and return "YES", if found, and "NO", otherwise. Although this procedure is theoretically appealing, it has some serious drawbacks and, unfortunately, is clearly inadequate for newspaper needs. The problem with this procedure is that TESTSP is unaware of the context in which the test word appears. Obviously, incorrect usage of a correctly spelled word could not be detected by a full dictionary search. It would be better if the dictionary contained only frequently occurring words. Highly infrequent and, probably inappropriate, words would then be flagged by TESTSP. Consider, for example, the two words "FOR" and "FRO". Should the word "FRO" be detected in a newspaper article, it is likely that the writer intended it to be the word "FOR" and accidentally transposed the final two characters. Obviously, a version of TESTSP which flags "FRO" as a possible misspelling is of more utility than one that doesn't. Effective spelling testing for newspapers must be viewed in the overall context of the editorial process.

The engineering requirements of a good spelling-proofing system are quite subtle. There are the obvious requirements of high speed and low system overhead. "Accuracy" requirements must be tempered with a realization of the limitations of any "context free proofing procedure". It is from these understandings that a design of the Micromark system evolved. It was hoped that a test routine could be built with an accuracy such that an undetected spelling error would be a rare occurrence. We felt that if spelling errors could be reduced by a factor of 1,000, then they would be an insignificant portion of the inevitable errors which will occur during any process as complex as creative newspaper writing. We hoped to derive a procedure that would be sufficiently accurate so that with it editors could concentrate on the more important aspects of quality writing.

If one accepts the argument that the TESTSP routine should be sensitive to the frequency of occurrence of English words, then it is evident that for a given word, TESTSP may return "NO" when, in fact, the word is correctly spelled. This type of error is called an "erroneous false." A high frequency of erroneous false readings would be annoying to editors. The checking mechanism of TESTSP should adapt to the vocabulary that appears in the newspaper. Common proper names, abbreviations, etc. should be passed by TESTSP as correct. Additionally, TESTSP should be sensitive to the start of sentences and proper names so that typographical errors in capitalization can be reduced.

In 1974, ANPA/RI, assignee of the present invention, developed and released a program called Automark based upon those principles. Large samples of wire copy were used to extract a dictionary of frequently occurring words. Automark maintained a sophisticated indexing scheme which permitted it to do a word lookup with as few as three disk reads. The source dictionary comprised about 14,000 words and required several hundred thousand characters of disk space. In a single user environment, this system provided acceptable performance on a mini-computer. However, in the modern shared multi-user on-line editorial/composition environment, it is essential that programs use significantly less system resources than Automark. The Micromark System was designed to overcome these difficulties. It requires no on-line source dictionary and makes no disk accesses for the TESTSP function. To achieve this remarkable result, we allowed a new error type to result from the TESTSP function. In addition to the previously mentioned erroneous false, the Micromark TESTSP routine of once per 1,000 misspelled words would be an acceptable level of accuracy. Daily newspapers currently experiencing a spelling error rate of 150 per day could, with such a system, reduce this to one per week. In fact, and as shown hereafter, this goal can be beaten by a factor of 100.

SUMMARY OF THE INVENTION

A. Basic Principles of Operation

One principle upon which Micromark is based is called "Binary Hash Coding with Allowable Errors". In simple terms this means that Mircomark checks for membership in a set by making educated guesses.

From information theory we can analogize memory bits (or binary indicators) to buckets. The preferred embodiment of Micromark has more than $\frac{1}{2}$ million "buckets" implemented with eight CCD (charged coupled device) chips of 64 K bits each. Half of the buckets contain a ball and the other half are empty. Each bucket is numbered and unique. Since half the buckets have balls in them, if you pick any bucket at random, the probability that the bucket will have a ball in it is 50%. Pick any two buckets at random, the probability that both of them will have balls in them is 25%. For three randomly chosen buckets, the probability is $\frac{1}{8}$ or $12\frac{1}{2}\%$. The formula is $(\frac{1}{2})^{**}n$ where "n" is the number of buckets checked. Thus, for n=20 the probability is less than one in a million that all 20 buckets will have balls in them.

When you start Micromark, it empties all its buckets. In its ADD mode, Micromark generates 20 random bucket numbers for each new source list item. In each of the corresponding buckets it then places a ball (i.e., it sets a CCD bit). After adding 20,000 items, approximately 250,000 (of its more than $\frac{1}{2}$ million buckets) will have balls in them. When Micromark makes a comparison test, the same random bucket numbers are generated for each item to be tested. If the item was in the source list, than all 20 of its buckets will have balls in them, placed there during the ADD operation on the initial list. However, if the item was not in the source then the probability that all of its 20 buckets would have balls in them is one in a million. Thus, the theoretical accuracy of the spelling-proofing application just described, is one error per million of misspelled words. Such an error occurs when Micromark believes an incorrectly spelled word is correct. This error is called an "Erroneous True".

B. Mathematical Analysis of the Underlying Algorithm

The mathematical analysis of binary hash coding with allowable errors first appeared in an article in the Communications of ACM on July 1970, entitled, "Space/Time Tradeoffs in Hash Coding with Allowable Errors, " by Burton H. Bloom. Here follows our further developments upon this concept, in mathmetical terms, for a better understanding of one basis of the present invention.

1. General Formulas

Taking into account the fact that each hash of each additional vocabulary word doesn't necessarily cause a bit to be set, we have:

$$e = \sum_{i=1}^{v} P(i)$$ where e is the expected number of bits set
v is the size of the vocabulary
P(i) is the probability that the i'th vocabulary word will cause a bit to be set for $i > 1$ $P(i)$ = relative density of zero bits before the ith word is added
= (relative density of zero bits before the (i − 1)th word is added) − (expectation of adding a bit due to the (i − 1)th word)
= $P(i - 1) - P(i - 1)/k$
= $P(i - 1) * ((k - 1)/k)$ and for $i = 1$, $P(i) = 1$, therefore
$P(i) = ((k - 1)/k)^{}(i - 1)$ where k is the number of bits in the hash table so $e = \sum_{i=1}^{v} ((k - 1)/k)^{}(i - 1) = \sum_{i=0}^{v-1} ((k - 1)/k)^{}i$ $= \sum_{i=0}^{inf.} ((k - 1)/k)^{}i = \sum_{i=v}^{inf.} ((k - 1)/k)^{}i$ but for $r < 1$ we know that $\sum_{i=1}^{inf.} r^{}i = r/(1 - r)$ or more generally $\sum_{i=j}^{inf.} r^{}i = r^{}j/(1 - r)$ -continued

```
so e = (1 − ((k − 1)/k)**v)/(1 − ((k − 1)/k))
    = k − ((k − 1)**r)/(k**(v − 1)
      (expected number of bits set)
and d = e/k = 1 − ((k − 1)/k)**v)
      (expected bit density)
```

2. Choosing a Minimal Hash Table Size

Given a vocabulary size v and an acceptable probability of an erroneous true p(e), we want to find the minimum hash table size k.

A. Choosing H, the number of hashes:

We know from information theory that information density is maximum when the expectation of ones is equal to the expectation of zeroes (i.e. when there is no a priori knowledge of a bit's value). This corresponds to a bit density of 0.5 which is also the probability of an erroneous true with a single hash, or more generally:

$p(e) = d^{**}h$ where d is the density
$H = (\ln p(e))/(\ln d)$
for $d = 0.5$
$H = (\ln p(e))/(\ln 0.5)$ Example: how many hashes necessary for $p(e) = 0.001$?
$H = (\ln 0.001)/(\ln 0.5)$
$H = 9.9658$
next highest integer value = 10
so 10 hashes will provide the desired level of accuracy.

B. Finding k(min)—the minimum hash table size—given v, H, and p(e).

→Hash table size will be at a minimum when hash table density is the maximum that will not cause p(e) to be exceeded.

d(max) (maximum density) $= (p(e))^{**}(1/h)$
Example: for H = 10, p(e) = 0.001
d(max) = 0.50118723
→From above we know $a = 1 − ((k−1)/k)^{**}v(e)$ Where v(e) is the effective vocabulary size, equal to the product of v and H. v(e) is the total number of entries to be made into the hash table so . . .

$d = 1 − ((k−1)/k)^{}hv$ or $k = 1/(1 − (e^{}[(\ln(1−d))/hv]))$

Example: for H = 10, v = 20000 and the d calculated above k = 287555 (approx. = 35K bytes)

This is the minimum number of bits to provide a 0.001 level of accuracy for a vocabulary of 20,000.

3. Verifying the Results

Let's check the effect of marginal changes on the parameters to check the validity of the asertion of 11.1.
→Holding hash table size constant, let's see the effect on p(e) of a change in H away from the calculated optimum of 10.
for H = 10, k = 287555, d = 0.50120496, p(e) = 0.00100033
H = 11, k = 287555, d = 0.5347126, p(e) = 0.00102172
H = 9, k = 287555, d = 0.46524148, p(e) = 0.00102119
so p(e) is at a minimum for H = 10.

→Holding p(e) constant, observe the effect of a change in H on k
for
H = 10, p(e) = 0.001, d = 0.50118723, k = 287555
H = 11, p(e) = 0.001, d = 0.53366992, k = 288392
H = 9, p(e) = 0.001, d = 0.46415888, k = 288500
so k is at a minimum for H = 10

4. Hash Table Sizes for Optimal Hash Counts

The above calculations can also be used to calculate a minimum hash table size given p(e) and v subject to a maximum H.

Example: H < =4, p(e) = 0.001, v = 20000
Since H(max) < H(opt) (= 10 from example above) we choose H = 4
so $d(max) = (0.001)^{**}(\frac{1}{4}) = 0.1778294$
$k = 1/(1 − (e^{**}[(\ln(1−d))/hv])) = 408580$

5. Independent vs. Interacting Hash Functions

The effect on p(e) of dropping the assumption that the hash function values are independent for each hash functions,
for v = 20000, H = 4, k = 524288
→using d as approximately $hv/r = 0.15258789$
p(e) = 0.0005421
→using $d = 1 − ((k−1)/k)^{**}hv$ = 0.14153382
p(e) = 0.0005421
Obviously the effect will be much greater on more densely packed tables.

6. Some Sample Calculations

| v \ p(e) / h | .φ1 / 7 | .φφ1 / 1φ | .φφφ1 / 13 |
|---|---|---|---|
| 1,φφφ | 9594 | 14379 | 19174 |
| 1φ,φφφ | 95931 | 143778 | 191733 |
| 2φ,φφφ | 191862 | 287555 | 383465 |
| 5φ,φφφ | 479663 | 7189φ7 | 958681 |
| 1φφ,φφφ | 959325 | 1.44×1φ6 | 1.92×1φ6 |
| 1,φφφ,φφφ | 9.6φ×1φ6 | 1.44×1φ7 | 1.92×1φ**7 |
|  | d = .51794747 | d = .5φ118723 | d = .49238826 |

| v \ p(e) / h | 1φ**−6 / 2φ | 1φ**−15 / 5φ | 1φ**−3φ / 1φφ |
|---|---|---|---|
| 1,φφφ | 28756 | 71889 | 14378φ |
| 1φ,φφφ | 287555 | 7189φ8 | 1.44×1φ**6 |
| 2φ,φφφ | 5751φ7 | 1.44×1φ6 | 2.88×1φ6 |
| 5φ,φφφ | 1.44×1φ6 | 3.59×1φ6 | 7.19×1φ**6 |
| 1φφ,φφφ | 2.88×1φ6 | 7.19×1φ6 | 1.44×1φ**7 |
| 1,φφφ,φφφ | 2.88×1φ7 | 7.19×1φ7 | 1.44×1φ**8 |
|  | d = .5φ119 | d = .5φ119 | d = .5φ119 |

Note that k increases in direct proportion to v for a given p(e), however, k only increases in direct proportion to the log of p(e) for a given v.

FIGS. 14 and 15 are two graphs which summarize the mathematical relationships established in the text.

C. Summary of Hash Coding Technique

Critical to the performance of Micromark is a hash encoding technique which is both extremely well-behaved and econmical to use. The hash functions should yield values uniformly distributed in the address space and should be very fast to calculate. The basic process of the hash function is to first reduce the redundant information in the input character string and then fold the resulting bit pattern to the length required. By way of further example, consider an implementaion requiring an error rate of one in a million and a vocabulary of 20,000 items. From the table above, this leads to twenty hash functions for each item to be checked and an optimum bulk memory size of 575,107 bits. At each of the 20 hash addresses a bit in a 64K byte (about ½ million bits) hash dictionary is set. Each hash function maps a representation of a test word into twenty 19-bit addresses.

Here is how each hash function is developed. First, each character in a string is scanned and mapped into a five bit number (i.e., 0–31). For each hash function this mapping may be different. This reduced representation of the word has a bit length of five times the number of characters in the input word. The next step is to make sure that each character is combined with the other characters of the test word in calculating he hash value. This was accomplished by devising a flip width for each function. (A flip operation on a bit string reverses its order.) At alternate intervals of the length of the fold width, the bit pattern is flipped. Five is not chosen as a flip width, because each character was initially mapped into a five bit number, hence the flip operation effectively mixes the bit patterns of the characters of the word together. The final operation is to overlay the bit string, (e.g. 19 bits at a time) with an "exclusive or" operation. The resulting number is the hash code bit address.

A Specific Hash Coding Example

Calculating the first hash code value for the word "example".

STEPS 1 and 2—Consider each character individually and substitute its ASCII octal value.

| e | x | a | m | p | l | o | (1) |
|---|---|---|---|---|---|---|---|
| 145 | 170 | 141 | 155 | 160 | 154 | 145 | (2) |

STEP 3—From the octal value subtract 141(8) (lower case "A"), 4 27 0 14 17 13 4       (3)

STEP 4—Substitute the five bit binary representation for each reduced octal value, 00100 01000 00000 01100 01111 01011 00100       (4)

STEPS 5 and 6—Combine all the bits into a binary sequence. Then separate the sequence into groups of three binary digits.

STEP 7—Flip (reverse) every other three digit sequence.

001/100/011/001/000/110/000/111/101/110/001/00       (7)

STEP 8—Recombine the sequences and divide into sequences of 19 bits,

0011000110010001100/0011110111000100       (8)

STEP 9—Fold every other group of 19 bits,

0011000110010001100/—0010001110111100       (9)

STEP 10—Perform an "exclusive or" on all the 19 bit groups. The resulting number is the bit location.

| XOR | 0011000110010001100 |
|---|---|
| | 0011000111011110 |
| | 0011010111100110000* |

*At STEP 10, it should be appreciated that the "exclusive or" step is where you lose the ability to map backwards, and recreate the unique word "example", once again. At STEP 10 we have lost all "uniqueness" between "example" and the resulting bit location—which now is used as a bit somewhere in the 64 K byte memory.

STEP 11—Map the bit address into memory location. Consider the high 16 bits as a byte address and low 3 bits as the bit position in the byte.

| 0011 | 010 | 111 | 100 | 110 | / | 000 | (11) |
|---|---|---|---|---|---|---|---|
| 3 | 2 | 7 | 4 | 6 | / | 0 | |
| BYTE ADDRESS | | | | | / | BIT POSITION | |

Therefore, the hash location for the first hash function generated upon the word "example 38 is the byte at location 32,746 (octal) and bit position 0 in that byte.

If we assume, now, that a total of 20 hash functions should be generated for the word "example", (for a theoretical accuracy level or an "erroneous true" of 1 in a million) it is preferred to ensure that all 20 functions are random. (i.e. Any value is as likely as another. ) There are 5 encodings done as in step 3. The second and third encodings can be any unique different arbitrary mapping of the letters into the numbers 0-31. In the preferred embodiment, taught hereafter, we increase the liklihood of randomness by making the fourth and fifth encodings the complement of the first and second.

With five strings, we can then parameterize each into 4 final values by changing the flip (or reverse width) used in STEP 7 of the process. The flip width is varied among the values 3, 4, 6, and 7 to produce different hash values. These steps lead to 20 well-behaved hash functions, for each word, and are implemented entirely with hardward for speed.

This hardware implementation of a hashing technique, in a very efficient manner, will be described in detail hereafter. A schematic of the preferred embodiment of the invention is shown as FIG. 1.

D. CCD Lookup

When the hash board yields a value, it is placed in a list. This list is set up so that when a 256 byte page of CCD data is available, the appropriate hash addresses can be examined. Each 19-bit hash value specifies a unique bit location in the CCD memory. The logical AND of the values at these locations determines whether a given word is accepted or rejected by Micromark. If the resulting value is true, a positive indicator is passed to the operator, otherwise, a negative indicator is passed.

BRIEF DESCRIPTION OF THE DRAWINGS

FIG. 4A is a control memory board buffer and decoder diagram.

FIG. 4B is a detailed diagram of a preferred control memory array.

FIG. 4C is a diagram of the control memory data bus buffers.

FIG. 11 is a schematic diagram of a clock circuit for the CCD memory devices.

DESCRIPTION OF THE PREFERRED EMBODIMENT

A. Overview

Figure 2:
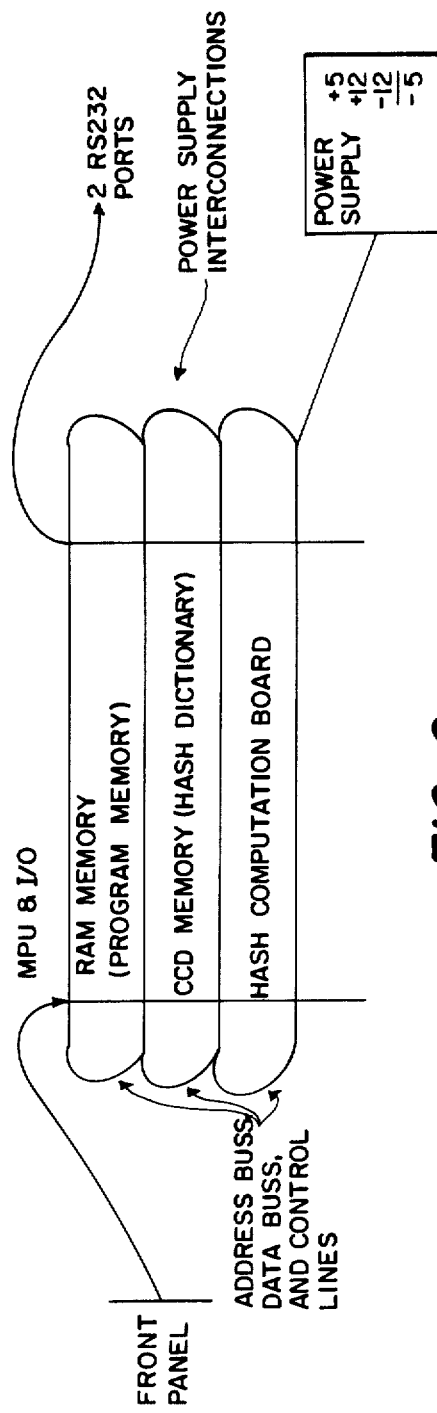
FIG. 2 is a preferred layout of Micromark component boards.

The micromark spelling-checking system apparatus is a "BLACK BOX", comprising a Motorola M6800 microprocessor, a high speed bulk memory, and a hash board, as shown in FIG. 2.

The microprocessor, along with the microprocessor software, performs a set membership test. It is first given a set of commonly used, correctly spelled English words. It forms a hash table from these words in its bulk memory. Then it is given words to be checked against this set. It responds with either a "YES" or "NO", depending on whether the word is in the original set.

The mainframe computer software scans the newspaper test, and passes each word, one at a time, to the Micromark "BLACK BOX". It displays the test on a video display terminal, with the questionable words underlined (those which received a "NO" response). After the text has been proof-read and corrected, it is transmitted back to the mainframe computer. This computer removes the underlines and stores the corrected copy on one file and a list of the underlined words (now assumed to be correct) on another file. This list may be used to update the dictionary.

The Micromark "BLACK BOX" system software is composed of three distinct groups of programs: The Micromark MPU resident software, the spelling-checking programs, and support utilities. The utilities include the souce dictionary maintenance programs, the hash dictionary maintenance programs, and the test programs. The first two groups make up the heart of the Micromark "BLACK BOX" system, while the remaining group form a subsidiary maintenance system, and need not be explained for an understanding of how to make and use the applicants' invention.

B. Summary of software in the Preferred Embodiment

There are three components of software in the preferred Micromark system embodiment. The first component is the software programs which reside on the mainframe or host computer (in our case a DEC PDP-11/45.) These programs provide an interface between text files, editing terminals, and the Micromark hardware. Each of these programs takes words from the text files, sends them to Micromark for checking, displays text with possible misspellings underlined on editing terminals, accepts revised text from the editing terminal and writes the corrected text to a file.

The second component of the software is that software which resides in a Motorola M6800. This MPU comprises one board in the preferred hardware, and is a general purpose microprocessor. The software in it is designed to provide communication with the software on the PDP-11/45 and to control the device itself. The essential action of it is to accept data from the PDP-11/45 (which may be words, in a spelling mode), and process these data through the Micromark hardware and return "true" or "false" signals to the PDP-11/45 software.

The third component of the software is that software which supports the other functions. This software includes programs which manage the English word or source dictionary (on the PDP-11/45) and which manage the hash table images and related test routines. Also in this category of support software is the software which is resident on a ROM chip called "SWTBUG", a copyrighted program of Southwest Technical Products, "SWTBUG's" routines provide primitive services necessary for most user-written programs in a microprocessor environment, FIG. 3 illustrates a layout of the various elements of a preferred MPU board; the interactions of the M6800 to significant associated elements of the illustrated circuit will now be discussed in greater detail.

C. MPU Board Circuitry

Figure 3:
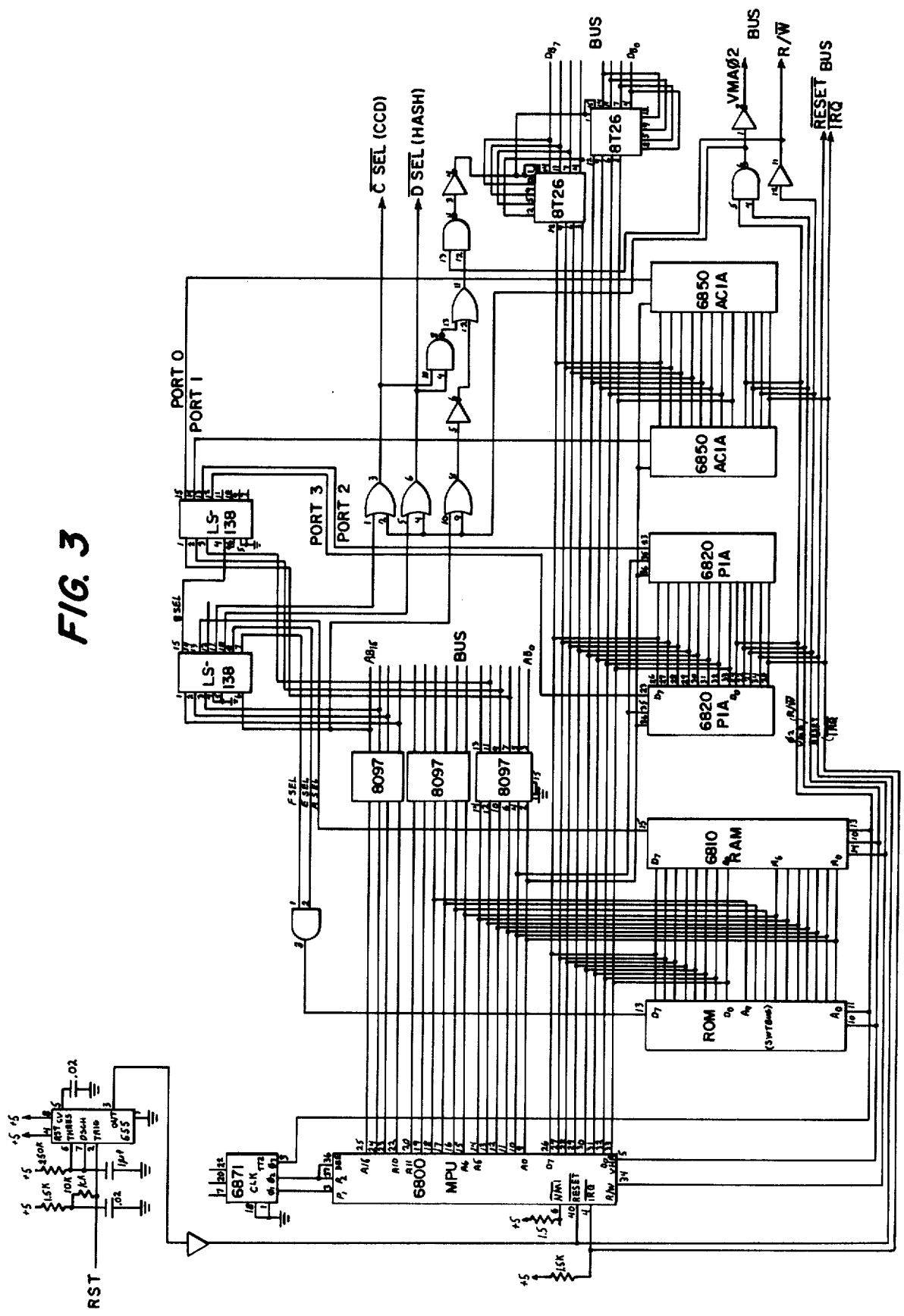
FIG. 3 is a central processing board logical function diagram.

The MPU board of FIG. 3 is based upon a known Motorola M6800 MPU. The board design follows the basic recommended M6800 configuration with the exception that MIK-BUG ROM has been replaced with a Southwest Technical Product ROM called SWTBUG.

Figure 1:
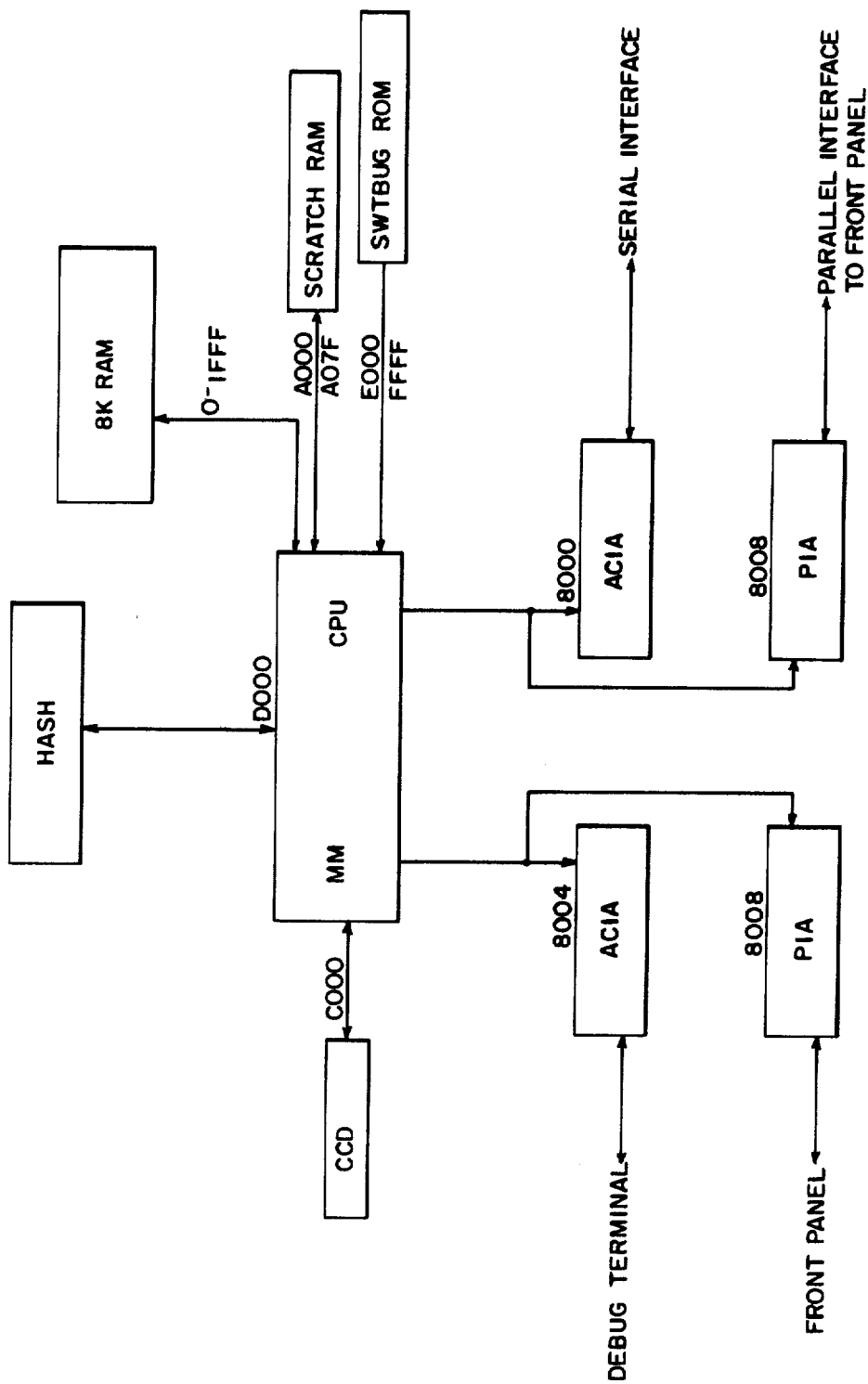
FIG. 1 is a block diagram of a preferred Micromark system.

The MPU board contains 1 ROM, 128 bytes of RAM, 2 parallel ports and 2 serial ports. They are located at the following addresses:

address 8000 port 0 serial interface port
address 8004 port 1 main serial interface port
address 8008 port 2 parallel interface port
address 8008 port 3 for the second parallel interface
address A000 to A07F the scratch RAM
address E000 to FFFF is the SWTBUG ROM Addresses 0 through 1FFF are reserved for main memory. The address range C000 through CFFF is reserved for the CCD board, and addresses D000 through DFFF are reserved for the hash board interface. Note: These addresses are illustrated with FIG. 1.

All features of the M6800 are available with the exception of the non-maskable interrupt line. The parallel ports are run through two PIA's. The serial ports are two ACIA interfaces.

For further details on SWTBUG ROM, which is simply used to load the MPU resident programs, the reader is directed to the SWTBUG manual, available, from Southwest Technical Products.

The MPU board of FIG. 3 closely follows the standard Motorola MPU design. Note: Individual components bear their standard TTL designators and relevant pin locations are also numbered. The MPU chip is driven by a 6871 clock circuit which automatically generates a 1 MHZ PHI1 and PHI2 clock plus a TTL PHI2 clock. The unbuffered address lines are connected directly to the ROM and RAM. The unbuffered data lines are connected directly to the ROM, RAM, PIA's, and ACIA's. This board also contains address decoding and circuitry to generate the bus signals. The 16 address lines are buffered to the bus through 8097 IC's and the bi-directional date lines are interfaced through 8835's IC's. The decoding for the RAM, ROM, and ports is performed by a 74LS138. The decoding is not performed for the main memory. The reset circuitry is designed to give approximately a ½ of a second reset signal on power on and when the reset button is pressed.

A baud rate generator generates crystal controlled clocks for the asynchronous ports. These clocks are switched on the front panel to provide 300, 600, 1200, 2400, 4800, and 9600 baud clocks for Port 1 and Port 0.

A divider on board generates 100 ms pulses to deliver to the PIA at 8008 to provide timer interrupts.

HOW THE M6800 WORKS WITH THE DEC PDP-11/45

Once the program has been loaded from the DEC PDP-11/45 into the M6800 RAM, then the command is issued to initiate the program in the Micromark M6800 resident software. In the production version of Micromark the program loading process will be avoided by storing this software in ROM as part of Micromark. At this point, the Micromark console terminal will show the words "Begin Micromark." From now on, the commands accepted by the Micromark M6800 processor are those commands which implement the Micromark function. These commands include load the CCD dictionary, dump CCD dictionary, add words to the dictionary, enter direct communication with the PDP-11/45, reset and clear the CCD memory, set the number of hash functions to be used, enter debug mode, and enter spelling mode.

MEMORY BOARD CIRCUITRY

Figures 4A, 4B, 4C:
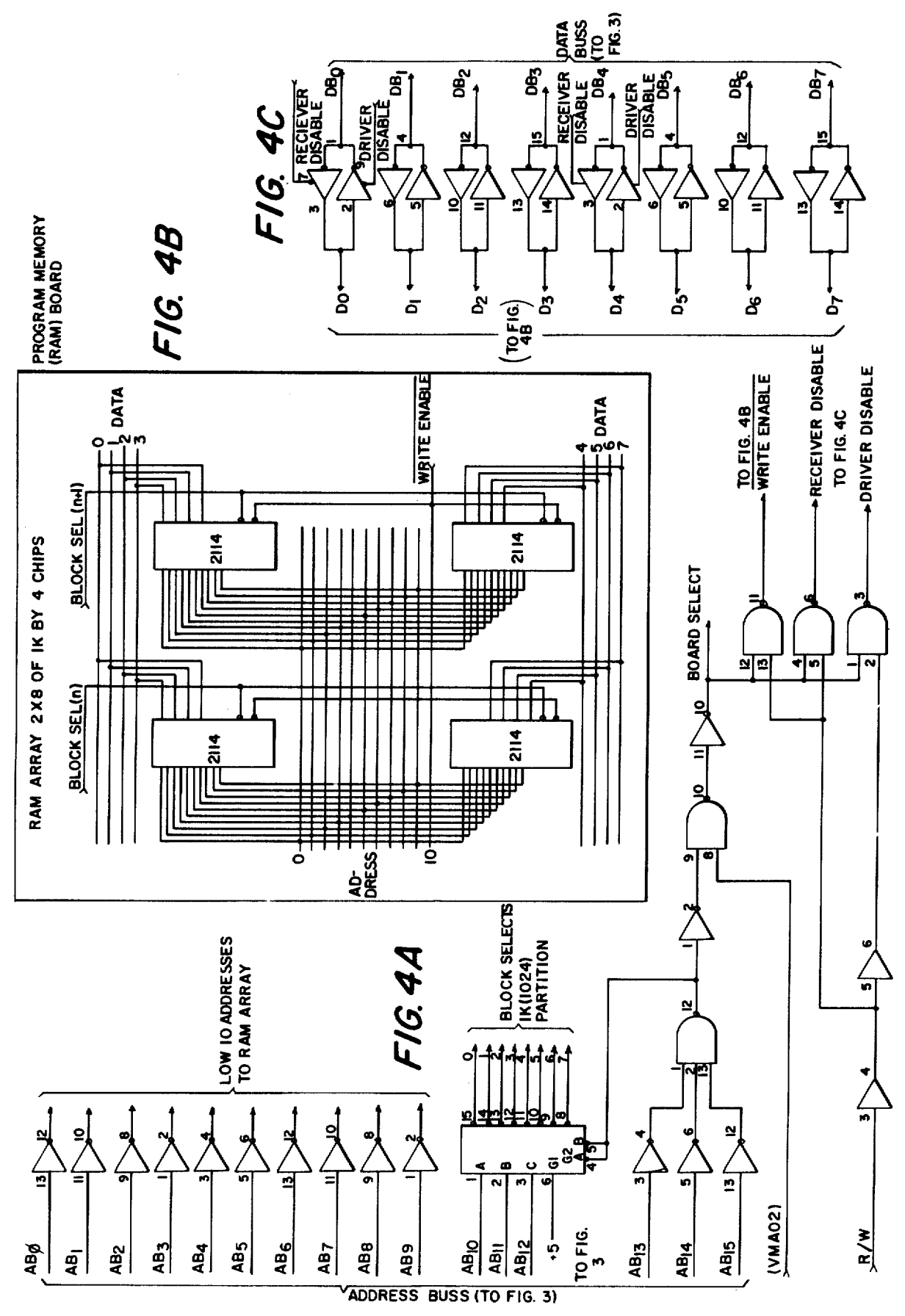

The Program Memory Board circuitry is shown collectively in FIGS. 4A, 4B, and 4C. A RAM is used for two functions. The first function is to store the Micromark resident program as it is loaded from the PDP-11/45. The second part is used as working storage during the operation of the device to store words being tested and their various internal representations.

The preferred memory board embodiment of FIG. 4 comprises 8K bytes of 2114 4K static RAMs. Each chip is 1K by 4 bits wide. Decoding for each pair of chips is provided by a 74LS138. Addresses are buffered off of the bus with 7404's and data is buffered with 8835's. Many circuits functionally equivalent to FIG. 4, of course, could be used to also manage the overall sequencing of the device, and the program control memory is not per se considered part of the present invention. Note: The hardware interconnections of FIGS. 4A, 4B, and 4C to the busses of FIG. 3 as shown. The hardward symbologies speak for themselves and need not be further discussed for a full understanding of this aspect of the invention.

INTERACTION BETWEEN HASH BOARD AND MICROPROCESSOR

The microprocessor receives a character string which constitutes a word. It then produces a table consisting of five representations of that character string which correspond to the various encodings of the word which is done by the processor and its software.

Figure 5:
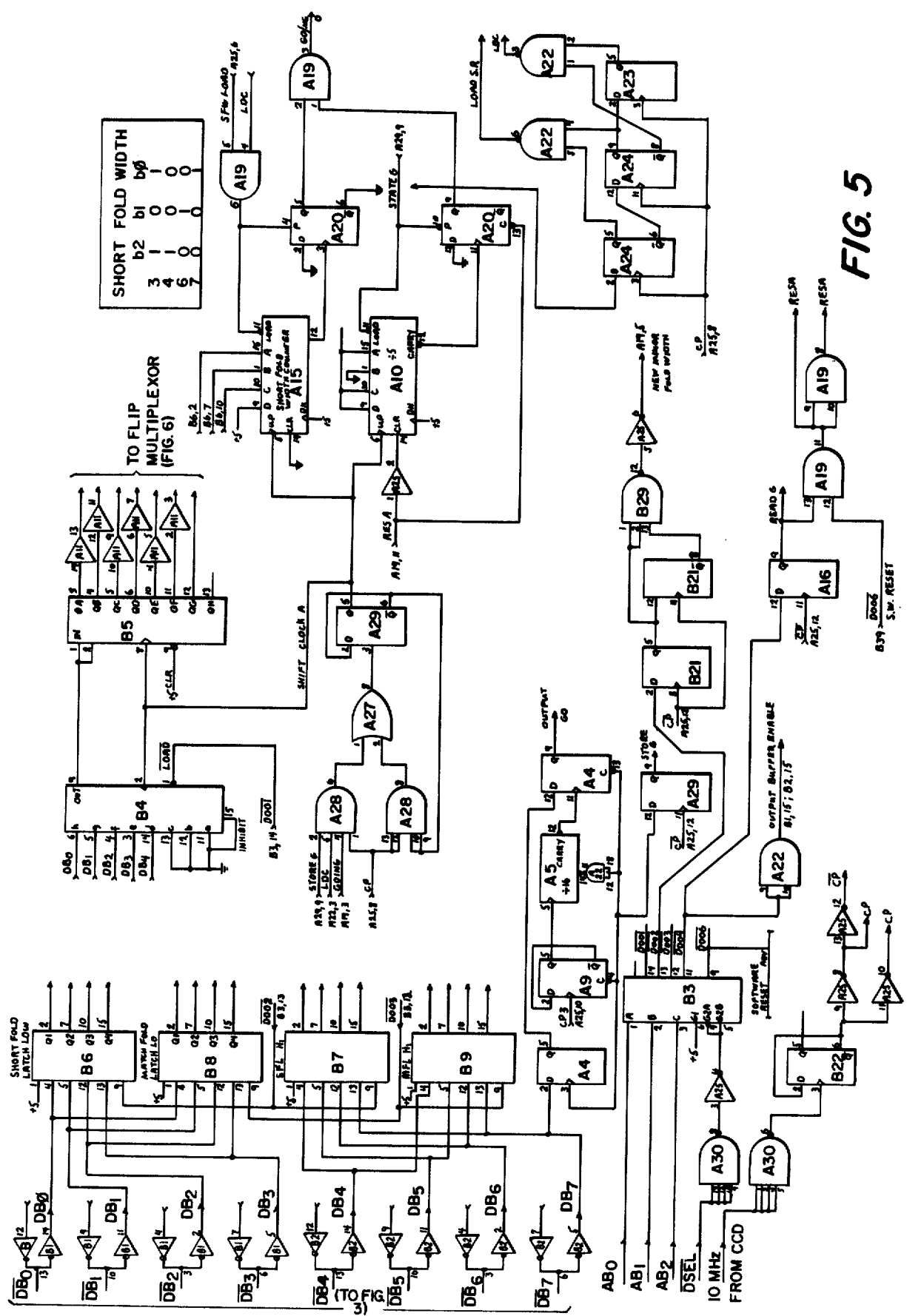
FIG. 5 is a diagram of preferred hash board clock circuits, input latches and data bus buffers.
Figure 6:
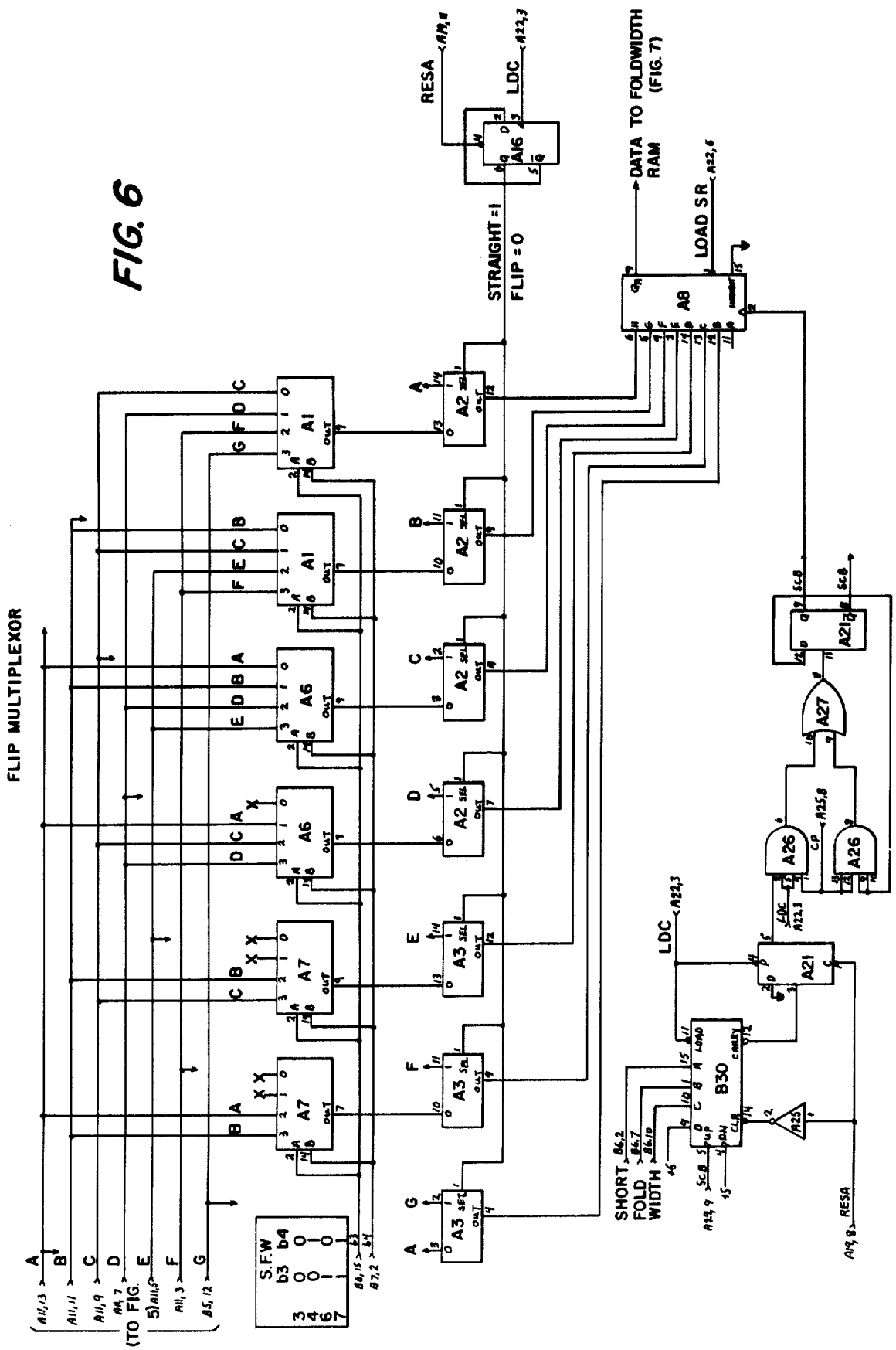
FIG. 6 is a diagram of a hash board flip multiplexor circuit.
Figure 7:
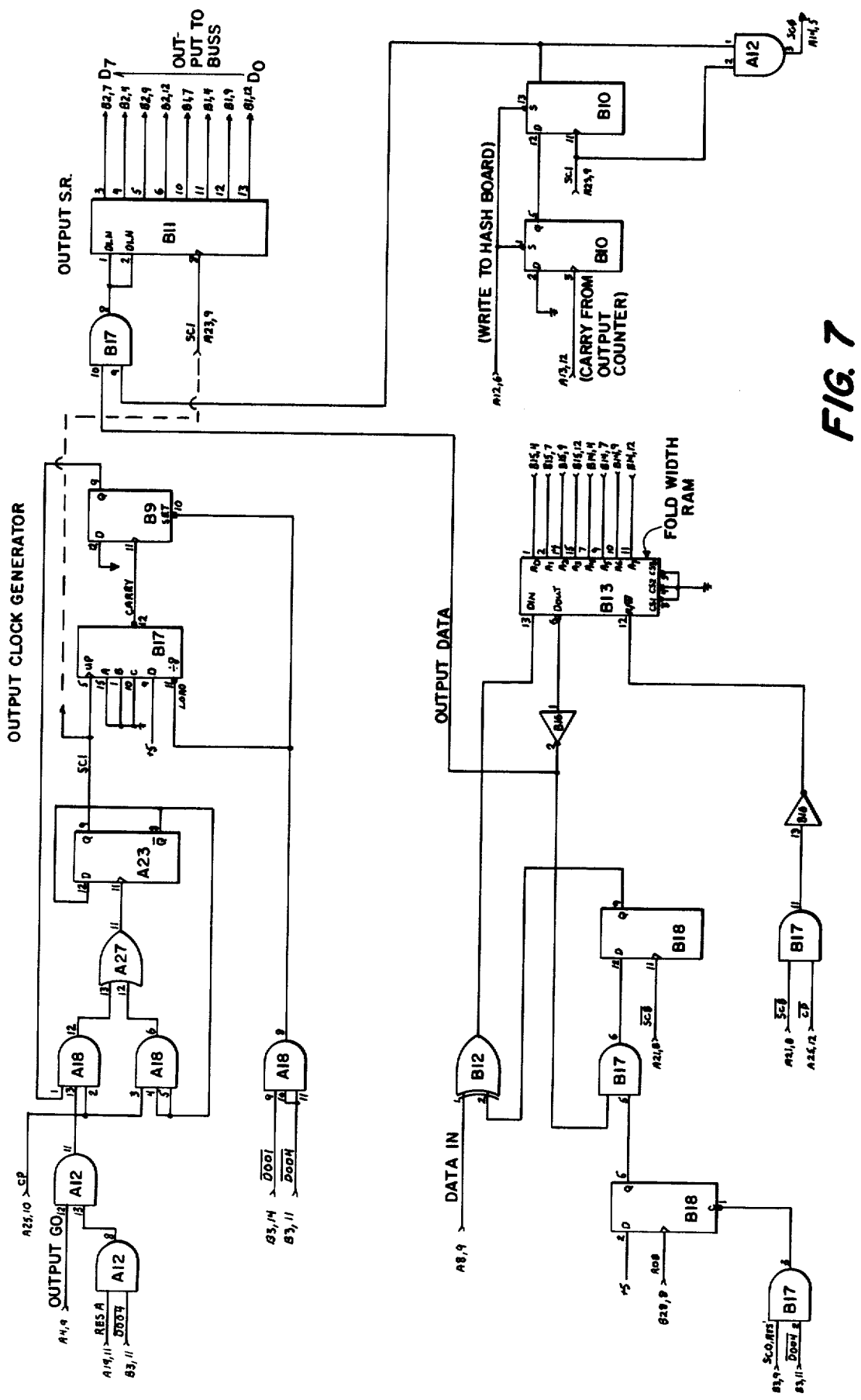
FIG. 7 is a diagram of hash board output clock circuits, output shift register, and a fold width RAM.

The five encodings are then sent to the hash board, with circuitry as shown in FIGS. 5-7. For each encoding, four hash functions are computed essentially by passing the character string to the hash board and changing the flip width four times, as earlier taught. A Flip Multiplexor (FIG. 6) implements the flip width. As the representation of the character string is passed "character by character" to the hash board, the bits of this representation are "exclusive or'd" into the fold width, as previously taught. Simultaneously, for every n bits, where n is the flip width, the process of placing the bits into the fold width is flipped, or reversed as previously noted. The counters, and associated circuitry, necessary to perform this logic is shown in FIG. 5.

To summarize, as the bits that represent the character come into the hash board, they are loaded into the area in which the final resulting hash address is built. The flip width is implemented by a Flip Multiplexor, as shown, which places the bits in the proper sequence in a 256-bit RAM; as shown in FIG. 6 and further illustrated as FIG. 7.

As previously noted, FIG. 5 schematically shows one circuitry embodiment for input and flip width counters, within the hash board. The referenced individual chips, as shown in FIGS. 5-7, may be conveniently further placed into two groups, A and B, within each group are 30 discrete chips, i.e. A1-A30 and B1-B30, inclusive. To further illustrate the preferred schematic of FIGS. 5-7 and the function of each chip, the chips are summarized in two tables, as follows:

| MICROMARK HASH BOARD CHIP LAYOUT (Group A) | | | | |
|---|---|---|---|---|
| 05 | 04 | 03 | 02 | 01 |
| 05/ 74193 | 7474 | 74ls157 | 74ls157 | 74ls153 |
| 10/ 74193 | 7474 | 74165 | 74ls153 | 74ls153 |
| 15/ 74193 | 74193 | 74193 | 7408 | 74365 |
| 20/ 7474 | 7408 | 7411 | 74193 | 7474 |
| 25/ 7404 | 7474 | 7474 | 7400 | 7474 |
| 30/ 7413 | 7474 | 7421 | 7432 | 7421 |

| MICROMARK HASH BOARD CHIP LAYOUT (Group B) | | | | |
|---|---|---|---|---|
| 05 | 04 | 03 | 02 | 01 |
| 05/ 74164 | 74165 | 74ls138 | 8t26 | 8t26 |
| 10/ 7474 | 74175 | 74175 | 74175 | 74175 |
| 15/ 74ls157 | 74ls157 | 93421 | 7486 | 74164 |
| 20/ 74193 | 7485 | 7474 | 7408 | 74h04 |
| 25/ 74193 | 7485 | 7474 | 7474 | 7474 |
| 30/ 74193 | 7410 | 7474 | 7408 | 7432 |

D. Hardware Implementation of Micromark Hash Function

The Micromark hash function receives a serial string of characters and by changing the order of the bits and "exclusive or'ing" of the resultant 'words' forms a hashed number corresponding to the input character string and hashing parameters.

The board can 'flip' bit strings of 3, 4, 6, or 7 bits in length and form a hash value that is 2 to 255 bits long. Therefore, the board has 4 addresses:
(1) Character input
(2) Flip width (flip bit length)
(3) Fold width (hash function length) and
(4) Output, The input string is of an arbitrary length greater than the fold width. The low order 5 bits of the input characters are used and the rest ignored. Character strings must be followed by one null (all zeroes) and a character (byte of data) and bit 8 set. This byte signals the end of the character string and causes the hash board to generate the output.

LOGICAL OPERATION OF HASH BOARD

Figure 8:
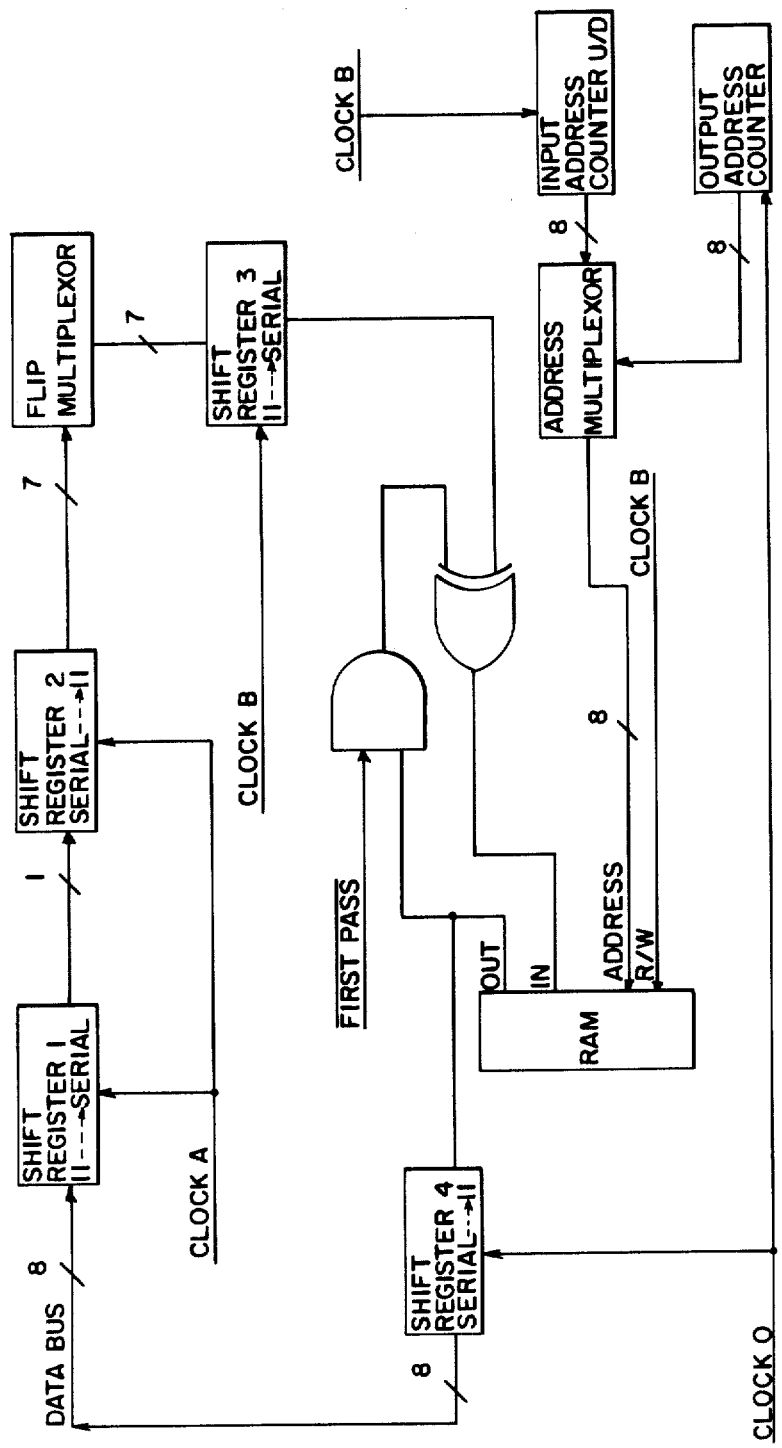
FIG. 8 is a logical diagram of preferred hash board function and data pathways.

The following description is primarily with reference to FIG. 8, a flow diagram of the functions accomplished by the hardware of FIGS. 5-7. A received character is latched into shift register 1. Negative pulses on the "clock A" line will cause the bits to be transferred to shift register 2. Transfer will continue until register 2 is full or register 1 is empty. Register 2 will hold a number of bits equal to the flip width.

When register 2 is full, register 3 is loaded. Register 3's input is either register 2's output direct or with the bit order reversed (flipped). This transfer causes register 3 to be marked non-empty and Register 2 marked empty. These processes are essentially asynchronous and depend only on the state of the registers (i.e., empty or non-empty).

The output of register 3 is "exclusive or'ed" with either a $\phi$ or the output of the RAM, and then stored in the fold width RAM. The fold width RAM address is generated by an eight bit up-down counter. On reset or when the output port is accessed, the counter is initialized to the fold width value. After each bit is stored, the counter is incremented to the next location. When the counter reaches a preset limit, it starts counting down, folding the bit pattern over the previous pattern. This continues until a complete word is hashed. On the first pass of a new word, the output of the fold width RAM is forced to the $\phi$ state so that the input pattern is unchanged. (a XR $\phi$ = a)

When bit 8 of the input is set, a counter is enabled that allows the hashing to complete and then switches the fold width RAM to the output counter and puts 8 bits in the output register. The output register is re-loaded every time it is read.

This up-down scheme allows any width hash function to be calculated as long as enough characters are input to ensure that one pass through the fold width is completed (i.e. the number of characters times five, or specifically the number of bits in the input string, is greater than or equal to the major fold width), with terminating bytes and flush buffers added by the Micromark resident software.

ORDERING OF CCD LOOKUPS

When the hash board yields a value, it is placed in a list. This list is set up so that when a 256 byte page of CCD data is available, the appropriate hash addressed can be examined. Each 19-bit hash value specifies a unique bit location in the CCD memory. The logical AND of the values of these locations determines whether a given word is accepted or rejected by Micromark.

While preferred embodiment employs a CCD memory, it will be readily apparent that other bulk memory types, such as RAM, could be employed, without departing from the invention.

Figure 9:
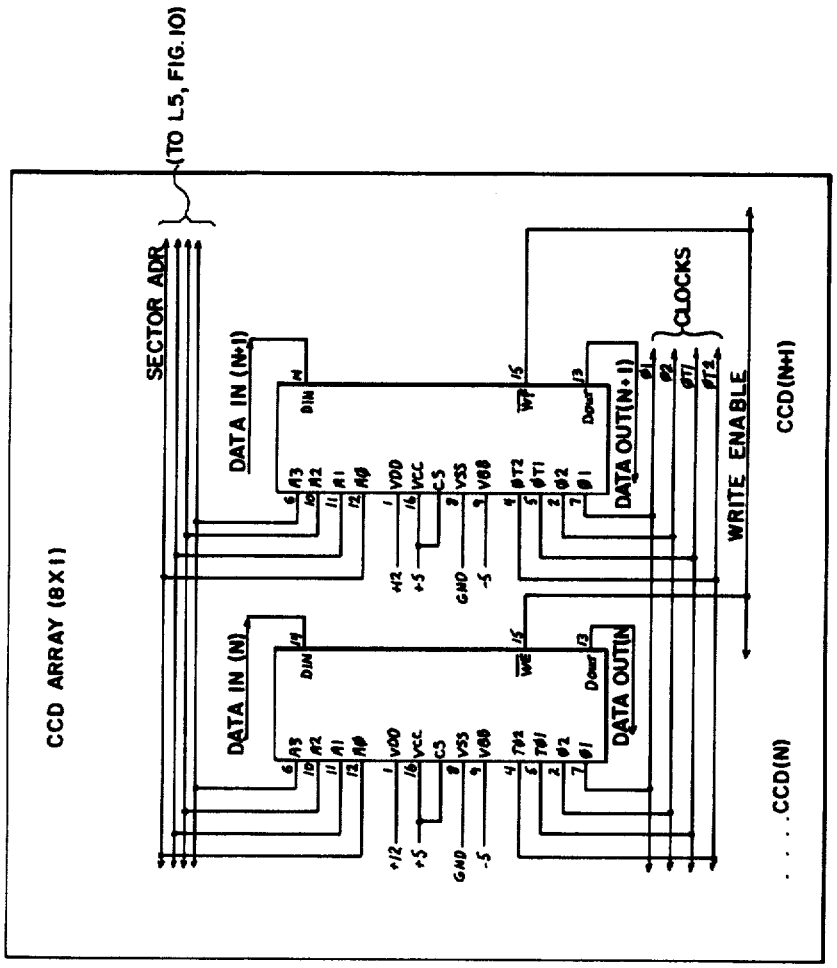
FIG. 9 is a detailed diagram of a preferred CCD bulk memory array.
Figure 10:
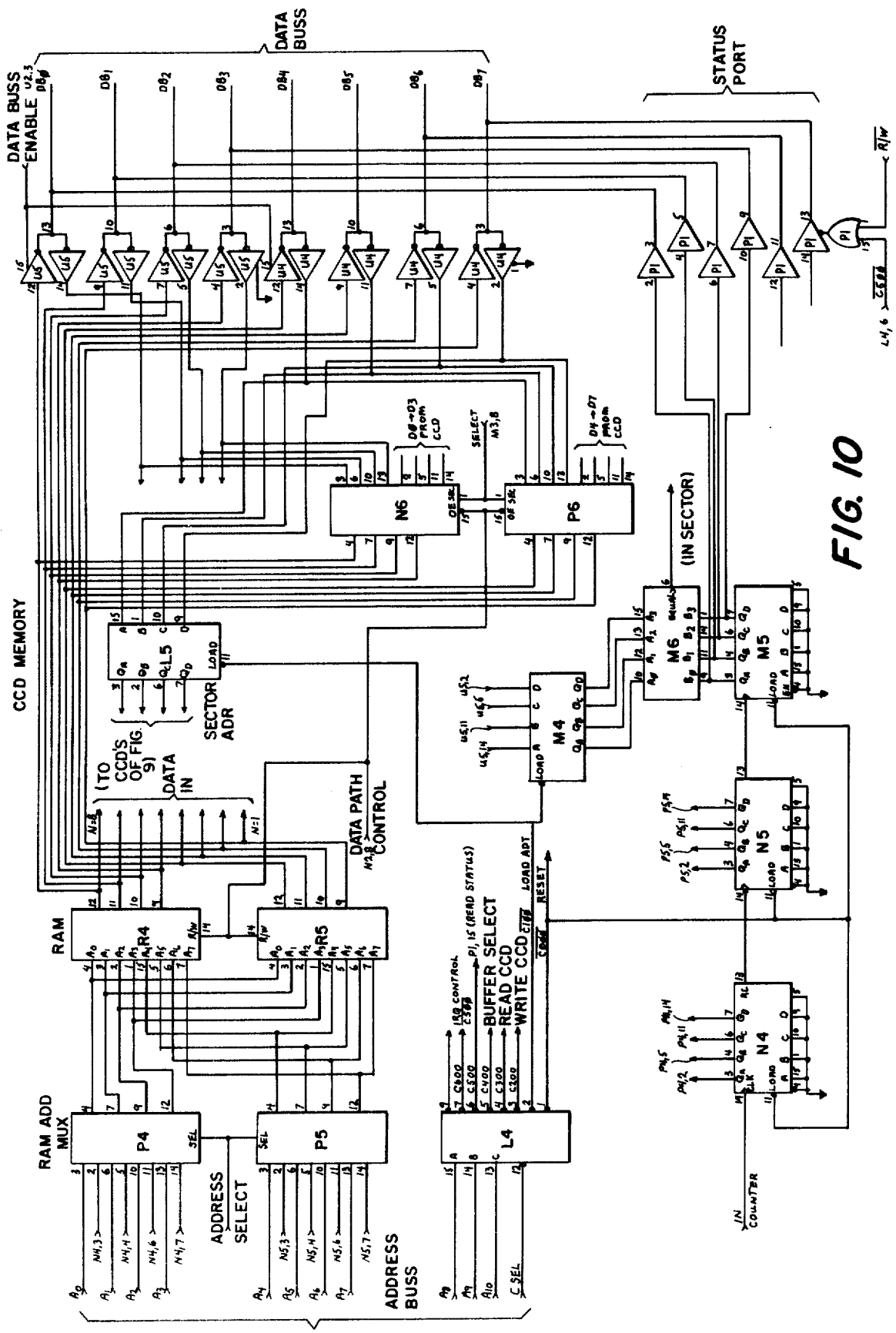
FIG. 10 is a functional diagram of preferred CCD bulk memory board, buffer RAM, and address multiplexor for bus addresses and CCD address counters.
Figure 13:
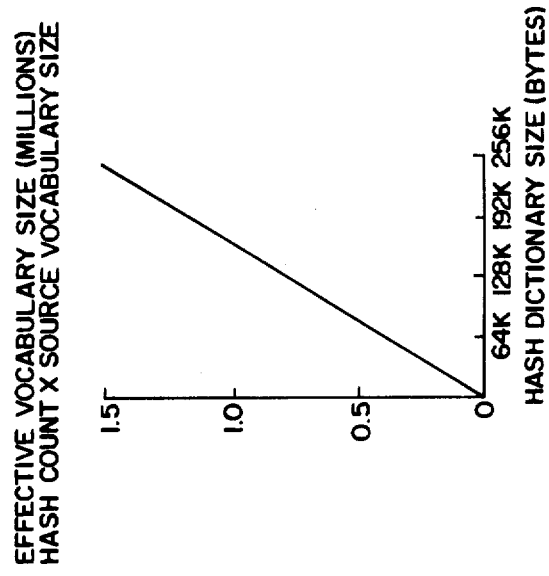
FIG. 13 is a chart of the relationship of vocabulary size to bulk memory size with a one in a millino theoretical error rate.
Figure 12:
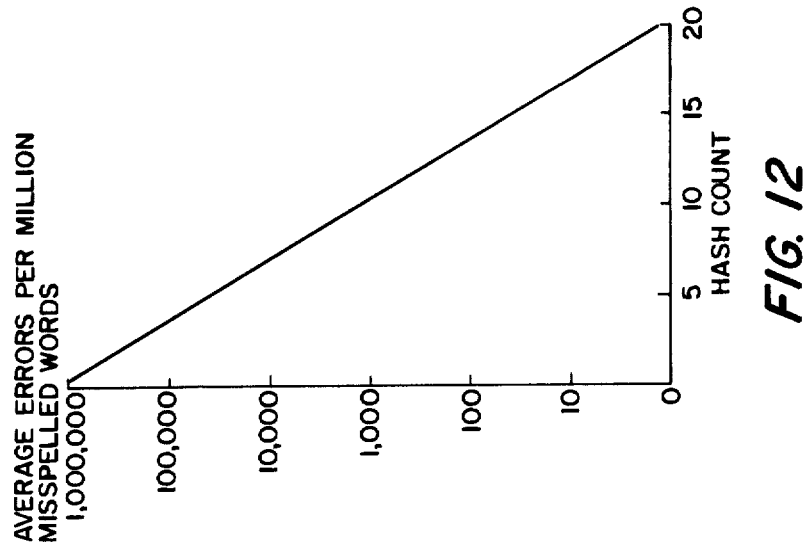
FIG. 12 is a chart of the relationship between average errors and hash count for a bulk memory size of 572,107 bits and 20,000 vocabulary words.
Figure 14:
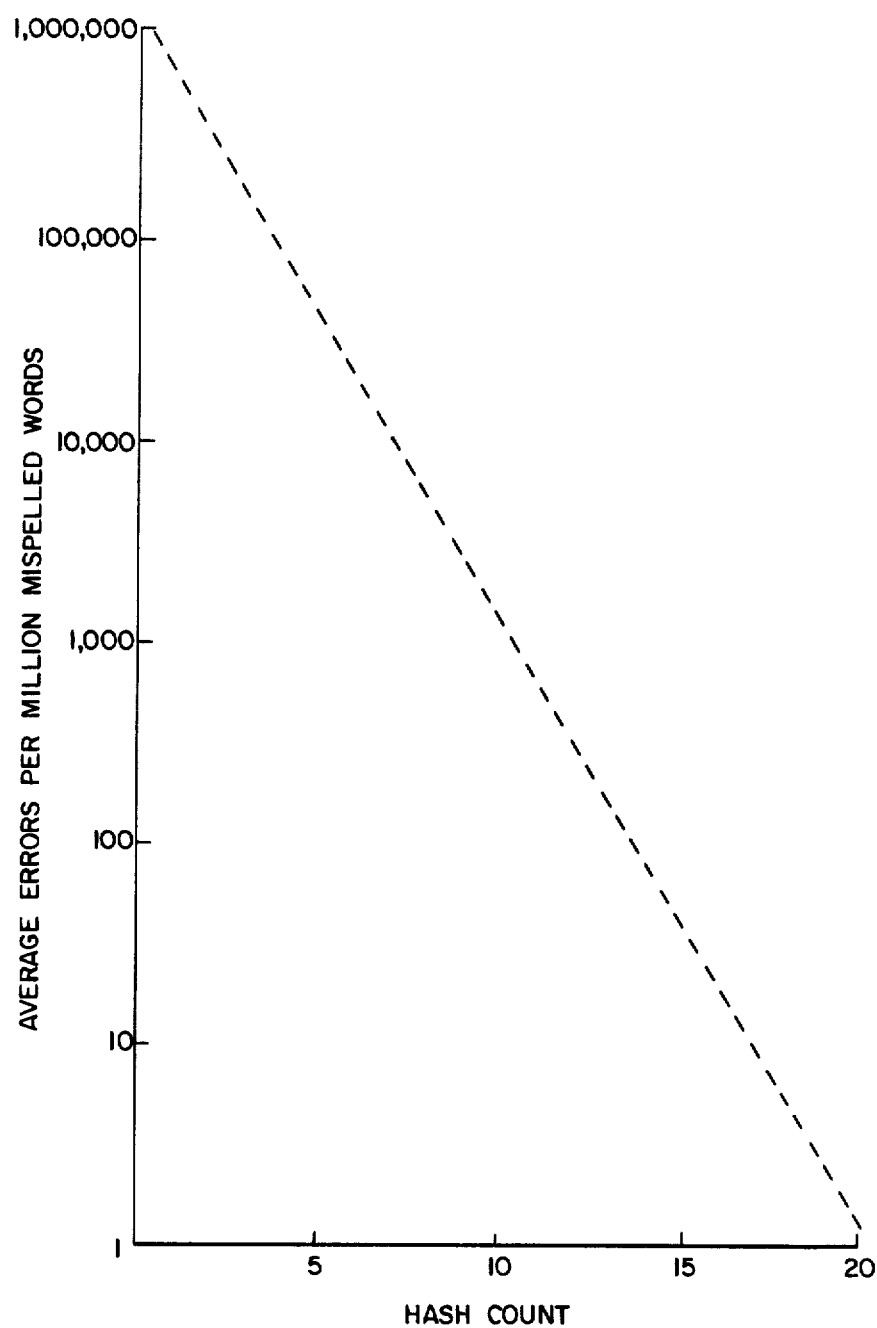
FIG. 14 is a graph of average errors per million misspelled words as a function of hash count.
Figure 15:
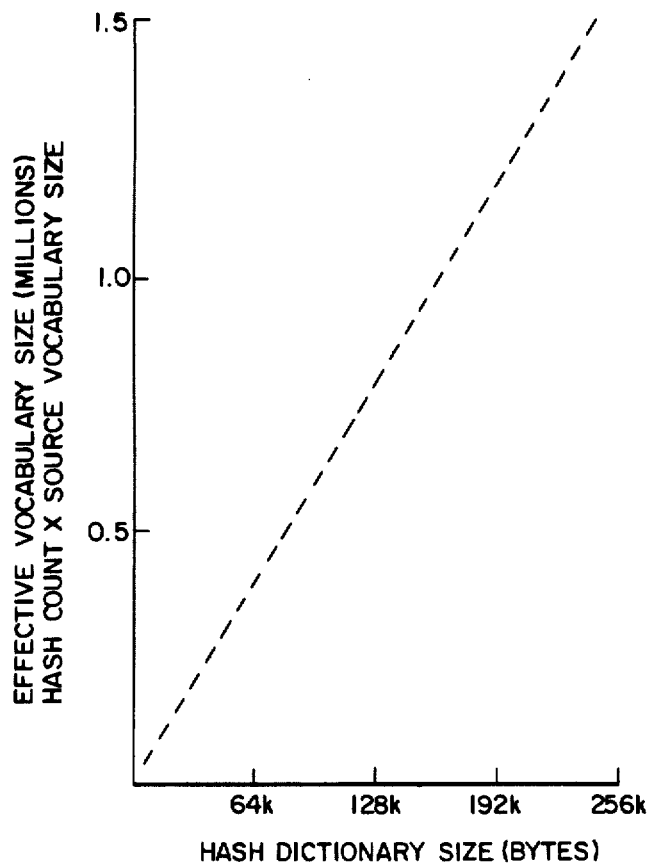
FIG. 15 is a graph of effective vocabulary size as a function of hash dictionary size.

Now follows a discussion of a preferred CCD-type memory board, as shown in FIGS. 9, 10, and 11.

E, CCD Memory Board

The CCD memory board shown is comprised of eight 64K bit re-circulating shift registers forming a 64K byte memory, and can be arrayed as shown in FIGS. 9 and 10. Access to the CCD memory is buffered through a 256 byte RAM which is labeled R4 and R5 on FIG. 10 at address location C400.

The CCD is organized as 256 blocks of 256 bytes each. Therefore, to access a location in the CCD, the high 8 bits of the address (the block address) are stored in location C100 and an operation is started by accessing a control address (C200 for a write and C300 for a read). The hardware then performs the requested operation on the CCD buffer RAM memory located at C400 and generates an interrupt when the operation is completed. Loading a 0 into the low bit of C600 disables the interrupt propagation. The status port (C500) indicates whether or not the CCD is done by testing ((bit 6 × 1) = BUSY). Further understanding of the preferred 65,536 bit dynamic serial memory illustrated in FIG. 9, and its array and timing controls can be had from the Fairchild users manual for the 464, (203-11-085-087 15 M, October 1977).

In summary, the operation of the CCD board of FIGS. 10 and 11 is as follows:
1. On system initialization access C000. This synchronizes all counters and clears pending interrupts.
2. To write a block:
   a. store the data in C400 to C4FF
   b. store track/sector (block) address in C100
   c. initiate write by accessing C200
   d. an interrupt signals completion
3. To read a block:
   a. store track/sector address (block) in C100
   b. initiate read by accessing C300
   c. wait for interrupt
   d. read data from C400 to C4FF
4. C500 is the status port:
   a. bits 0 to 3 are the current sector address
   b. bit 6 is CCD busy
   c. bit 7 is interrupt sratus.

CCD BULK MEMORY HARDWARE

Since the CCD is a serial or shift register device, the only way to keep track of addresses accessable at a given time is by a counter. This counter is 12 bits long, where the low 8 bits form the address within the block (or buffer address) and the top 4 bits are the sector address.

The reset address (C000) clears the interrupt mask, read and write operation latches, and sets the counter to 0.

When track/sector address is stored (in C100), the address is latched into into two 74191's (L5 and N5). The track address (L5) is placed on the CCD address pins; the sector address (N5) is compared to the current sector counter (M5), which is the top four bits of the 12 bit address counter. When the sector address equals the sector counter, INSECTOR becomes 1.

A READ or a WRITE operation is initiated by accessing C300 or C200. This sets a latch (M3) indicating that an operation is pending (N1 pin 6). This is the CCD busy signal to the status port bit 6.

When the INSECTOR signal equals 1 (i.e. s "true"), the operation pending status is latched in P2. In an operation, the read strobe or write strobe is gated through R2. The operation pending also selects the low 8 bits of the 12 bit address counter as the address of the buffer RAM. Although it is possible to initiate a READ and a WRITE operation at the same time, this mode should be avoided because it yields ambiguous results and may garbage the data in the CCD's.

A READ operation selects data from CCD's (N6, P6) and enables a write atrobe to the buffer ram. This causes data from the CCD's to be stored in the buffer RAM.

A WRITE operation write-enables the CCD's, reads from the buffer RAM and leaves the output of the data selectors (N6, P6) disabled. This causes the data in buffer RAM to be stored in the CCD's.

After 256 bytes have been transferred by either operation, the INSECTOR equals zero (i.e. equals false). This clears P2 pin 5 and (M3 poin 9 or M3 pin 5). This clears the CCD busy signal which causes an interrupt to be generated by R3 pin 9.

If the INSECTOR becomes true with no operation pending, the signal from N1 pin 3 signifies nothing to do and nothing happens. If an operation request is made while INSECTOR is true, it is too late to change anything and the counters must go through a complete cycle.

With no operation pending, the address selectors (P4, P5) point to the bus and the buffer RAM (R4,R5) may be accessed through addresses C400 to C4FF.

CCD CLOCKS

The CCD's require two non-overlapping positive clocks with a frequency between 500 KHZ and 4 MHZ (referred to as PHI1 and PHI2). These CCD's also require two transfer clocks (called T1 and T2) of similar pulse widths as PHI1 and PHI2, but of 1/32 the rate. The phase of PHI1 and T1 vary as do the phase of PHI2 and T2. The reader is preferred to Fairchild Publication F464.

The output of K2 pin 9 is a 10 MHZ square wave. This clocks a 5 bit-recirculating shift register with output inversion (K1, K2), forming a 1 MHZ square wave. The leading edge of this signal causes a series of timed pulses to be formed at the outputs of L3 and L2 pin 3 and 6. These are combined to form the read strobe and the write strobe. The trailing edge causes the counters to increment.

K4 and K5 form a 5 bit counter that acts in conjunction with decoders K6 and L6 to form negative pulses at count=29, 31, 61, or 63. These are gated with the properly phased outputs from the shift register to form the transfer clocks.

The clock inputs of the CCD chips are high-level (+12 V) generated by S2, T2; MOS drivers for the CCD's.

Finally, to further illustrate the exact chips employed in the preferred embodiment of a CCD-type serial memory, illustrated in FIGS. 10 and 11, here follows a table further identifying those chips by location and type:

| LOCATION | TYPE | LOCATION | TYPE |
| --- | --- | --- | --- |
| K1 | 7495 | R1 | 74S04 |
| K2 | 7474 | R2 | 7420 |
| K3 | 7404 | R3 | 7400 |
| K4 | 74191 | R4 | 2112-4 |
| K5 | 74191 | R5 | 2112-4 |
| K6 | 7442 | R6 | |
| L1 | 7404 | S1 | |
| L2 | 7400 | S2 | 9644 |
| L3 | 7400 | S3 | 464 |
| L4 | 7442 | S4 | 464 |
| L5 | 74191 | S5 | 464 |
| L6 | 7442 | S6 | 464 |
| M1 | 7400 | T1 | |
| M2 | 7402 | T2 | 9644 |
| M3 | 7474 | T3 | 464 |
| M4 | 74191 | T4 | 464 |
| M5 | 74191 | T5 | 464 |
| M6 | 7485 | T6 | 464 |
| N1 | 7400 | U1 | |
| N2 | 7404 | U2 | 7408 |
| N3 | 7404 | U3 | 7404 |
| N4 | 74191 | U4 | 8T26 |
| N5 | 74191 | U5 | 8T26 |
| N6 | 74S257 | U6 | DM8095 |
| P1 | | | |
| P2 | 74LS74 | | |
| P3 | 7404 | | |
| P4 | 74157 | | |
| P5 | 74157 | | |
| P6 | 74S257 | | |

F. Detailed Example

Applicants now will describe how a simple story is processed by a preferred apparatus embodiment, i.e., an interactive spelling-proofing system which uses the Micromark "Black Box". The initial conditions of the test are as follows. There exists a file named TEST, on which the text of the theory resides. The entire text of the test story is "This example is ezie." What we shall do is trace the processes involved in taking the initial story through the spelling-checking and text editing process to produce a cleanly edited story. This will show the relationships between the software which runs on the PDP-11/45 (Interactive Micromark) and the resident software and hardware systems in the Micromark "Black Box". An overall description of the tasks involved follows:

1. Accept and setup the story for spelling-checking.
2. Check the spelling.
3. Display the result of the spelling test with error words flagged.
4. Accept the result of user editing of the displayed text and place the text on the output file.

After the text has been placed on the output file, it is assumed to be suitable for processing by composition and typesetting software. When Interactive Micromark is initiated, it requests the system file name of the story to be proofed. Then it sends a "SS" to the Micromark "Black Box", indicating that the words which follow are to be checked for correct spelling.

1. Setup

After the user enters the file name, Interactive Micromark associates a file variable with the system file and returns a portion of the story into its data area. In our example, the name of the file is TEST and, due to its small size, the entire file can be read into Interactive Micromark's data area. The setup process involves reading sentences. For each sentence several word and punctuation sequences are loaded into a sentence buffer. The loading of word/punctuation sequences involves manipulation of character data. The data associated with the sentence buffer includes the location of the start of each word and its length. The process stops when the program finds a sentence terminator (i.e., period, exclamation point, question mark, end of paragraph, or end of text).

2. Spelling-Checking

We now begin the process of spelling-checking, spelling-checking begins with handling upper and lower case characters. Words beginning with capital letters that begin sentences or are preceded by double quotes are converted to lower case for the initial test. If such a word fails the spelling test, it is later retested capitalized. After case conversion, all the words are checked in sequence. The first word of our test is the word "this". The program observes that this word is less than 5 characters long and it, therefore, tries to test the word in the memory resident word list. A table index is computed based on the first and last character of the word and its length. Should the test word be at the table location, the resident word list tester returns "true", otherwise, "false." The resident word list consists of 51 high frequency small words of less than 5 characters in length. For typical English text this test will return "true" for about 37% of the words tested. For the word "this" the resident word list tester returns "true." The next word to be tested is the word "example". This, word is not less than 5 characters long and is therefore, passed to the Micromark "Black Box" for testing. The details of this process will be explained later. Assuming "example" is in Micromark's vocabulary, it will return "true" on this test. Next the word "is" is tested and it returns "true" from the in-memory word list test. Finally the word "ezie" is tested using the in-memory word list test, which returns "false", and then tested by the Micromark "Black Box", which also returns "false". The word is then marked as being misspelled. At this point the "t" in "this" is converted back to a capital "T". Had this word been flagged as misspelled, it would be retested at this point with a capital "T". Because the word "ezie" was marked as misspelled and was followed by a period, it is retested as "ezie," and again fails the test and is marked as misspelled.

3. Display

Now the sentences which have been checked and are in the PDP-11/45's data area are formatted for screen display. This process involves inserting new-line characters in the text so that it will fit properly on a video display terminal screen. For any word which was marked during the spelling testing, underline characters are added to screen display. The screen buffer is now transmitted to the terminal for user editing. The user now sees the text "This example is ezie," with the word "ezie" underlined. He uses the terminal editing features to position the cursor at the erroneous word and modifies "ezie" through key strokes to read "easy." After completion of user editing, the operator initiates the transfer of the screen data back to the host PDP-11/45.

4. Accept and Output Text

This process involves reading the text from the screen, stripping out underlined characters and writing the resulting text to the output file. During this process any underlined words are assumed to have been corrected by the user. These underlined words are also written to an error word file for later inclusion in the Micromark vocabulary. When all of the text has been processed, a "SE" is sent to the Micromark "Black Box" indicating the end of the words to be checked for spelling.

MICROMARK "BLACK BOX" INTERNALS

We now again discuss the process of testing the word "example", and at the Micromark "Black Box" level. In order to do this the word is passed to the Micromark hardware using a standard write-to-terminal operation. (The PDP-11/45 program treats Micromark "Black Box" as a standard character-oriented terminal and the "Black Box" faithfully replicates this protocol.)

A number of processes occur concurrently during processing of a candidate word by the Micromark resident software. The two basic concurrent processes are those which accept character data from the PDP-11/45 and those which function the Micromark hardware during the test process. The input process captures characters sequentially and loads them into a buffer area as they are transmitted from the PDP-11/45. This process is interrupt driven. The process involved in testing a word is as follows:

1. Build 5 internal representations of the word based on different character coding schemes.

2. Take the 5 representations and pass each one to the hash board four times, varying the hashing parameters (i.e. the flip width). Accept from the hashing board each 19-bit value producing 20 hash codes in all.

3. Order the hash code values for efficient CCD lookup. Test the values of the bits at the locations indicated by each of the hash values and produce the logical AND of the result of the tests. If the resulting value is true, pass a positive indicator to the PDP-11/45, otherwise, pass a negative indicator.

We will now discuss some of the processes mentioned above in more detail.

1. Build Internal Representations

The input word is mapped into its 5 different internal representations by a character lookup technique. The first of the 5 representations is produced by mapping the small integer which represents the character "a" into the number 1. The number representing "b" is mapped into 2, etc. The second representation is produced by a similar mapping, only this time the result is by the frequency of the character's occurrence in the English text. Thus, "e" goes into 1, "a" into 2, and so on. The third mapping is simply a random permutation of the small integer values in the range of 1-31. The fourth and fifth representations are the compliments of the first and second on a scale of 0-31. Numbers and capital letters are encoded using shift characters.

Needless to say, any choice of encodings, which are pair-wise complements of each other, will have the desirable properties of the encodings used above. It should be appreciated that choosing complementary representations yields a total set of bit strings for a given word which tend to have 50% of their bits set. Since this minimizes the a priori knowledge of any bit string value, the randomness of hash values is enhanced.

2. Hashing

Take each of the 5 representations and pass it to the hash board four times, varying the hashing parameters. To further appreciate the unique facility of the hash board, there now follows a more detailed illustration of FIGS. 5-8.

SUMMARY

The Micromark hardware is a combination of machine elements, synergistically combined to allow rapid set membership testing with predictable accuracy.

Applicants have approached the problem of set membership testing by firstly, utilizing high-speed bulk memory in an unusual way, and secondly, teaching a high-speed special purpose hash board to compute hash values and using said values as locations of indicators in that bulk memory such that the density of indicator settings is optimum.

In the absence of either of these two elements, one could not implement this new process as a whole, let alone the step based upon a known algorithm. Applicants herein have taught an extremely well-behaved hashing technique, with hash functions that are computed in hardware in a novel way to keep the overhead of computing a large number of hash values low. The computation of 20 hash values for each particular word (or other items of a set) comprises the dominant computational effort within the overall system.

The use of a hash board is considered an essential part of the present system, since it is in itself a new way of generating extremely well-behaved representations when applied to a set consisting, for example, of words in the English language. The hash board does not concern itself with the nature of the set for which it is making an array of addresses, since the entire set is encrypted in memory (the encrypted representation being simply approximately 50% of the bits in a memory being switched to the "on" position). This hash board hardware is of great utility, and is the significant basis upon which the present process and its hardware implementation is based.

As has been previously noted, the basic algorithm used within the operation steps of the present invention is per se known, and improvement is not predicated upon the algorithm. Rather, the present invention is a machine implemented-process, wherein the process itself consists of steps heretofore unknown for the particular purposes taught.

Applicants consider their above illustrations of exemplary hardware and supporting software logic sufficient to enable one of ordinary skill in this art to make and use this invention.

However, in order to manifestly illustrate the use of the present system, applications will now further illustrate an exemplary sequence of program logic for an Interactive version, as has been previously discussed. The Interactive Micromark system allows a user to interactively proof-read and edit a newspaper story. The following discussion of the Interactive Micromark program constitutes preferred software sequence on a computer, which in the preferred embodiment is a PDP-11/45. Of course, this illustration of preferred embodiment is not to be considered limiting, insofar as many equivalent program routines would occur to those of ordinary skill in this art, without departing from the invention defined in the appended claims.

INTERACTIVE MICROMARK

Interactive Micromark allows the user to interactively proof-read and edit a newspaper story. The story is displayed on the screen, one page at a time. Words which are flagged as misspelled by Micromark are undelined. The user edits the story on the terminal and transmits it back to the computer. The corrected story is written to the output file and the words which were underlined are written to the error file. This file may be used for updating the Micromark dictionary.

FILE I/O

Interactive Micromark operates on two kinds of files. There is one newspaper story input file which contains the text of the newspaper story, and is in free format. There are two output files; the newspaper story output file which is identical in structure to that of the newspaper story input, and the error file which is a file of words, stored one word per line.

TERMINAL I/O

In addition to file input/output, Interactive Micromark also performs terminal input/output. Communication with the Micromark "Black Box" is done by reading from and writing to the terminal to which it is connected. Reads and writes are performed by standard FORTRAN READ and WRITE statements. Interactive Micromark communicates with the user's terminal in block mode. Information is transmitted to the terminal, the user edits the information on the screen and transmits the information back to the computer. Block mode transmission is performed by VDTIO, a subroutine package which contains SNDPAG, RCVPAG, WRTVDT, RDVDT and CLEAR.

DATA STRUCTURES

Interactive Micromark has two primary data structures, the sentence and the screen. The sentence data structure is represented by the common block SNTNCE. The characters which make up the sentence are stored in SNTBUF, with BUFLEN pointing to the last character in the sentence. The sentence buffer is parsed into words and punctuation when it is read in. Words consist of any character string made up of alphabetic characters including imbedded or trailing hyphens, apostrophes and digits plus imbedded periods. Punctuation consists of all of the remaining characters in the sentence, including blanks. WORDS(I) points to the first character in the I'th word and WRDLEN(I) contains its length.

PUNCT(I) points to the punctuation following the I'th word and PNCLEN(I) contains its length. SNTLEN indicates the number of word/punctuation pairs that exist in the sentence. OK(I) indicates whether the I'th word was spelled correctly and CAPS(I) indicates whether or not the first letter of the I'th word has been changed to a small letter for spelling checking.

The screen data structure is represented by the array PAGES, which contains two 2048 character screens, and by the common block SCREEN. PAGES contains the text of the two screens which are operated upon simultaneously. SCREEN contains information which is used while a screen is being built. SWIDTH is constant throughout the execution of the program and is used to indicate the maximum width of the screen. No more than SWIDTH characters will ever be placed on one line. PGINDX contains the index of the last character in the screen being built. LINLEN contains the number of characters on the current line being built and LINCNT contains number of lines which have been built. Once a screen has been built, a terminator (EOT) is inserted after the last character. No pointers are necessary while the screen is being edited.

MAIN PROGRAM (MMI)

MMI first calls subroutine INITAL to initialize variables and open files and then it initializes the page indexes PG1 and PG2. It calls GENPAG to generate the first screen and SNDPAG to send the pages to the terminal. It then repeats the following process until end of file is reached on the input file. It calls GENPAG to generate a second page, receives the edited first page via subroutine GETAG, sends the second page to the terminal for editing with subroutine SNDPAG, then writes the edited first page to the output file with subroutine WRTPAG. It then calls subroutine SWITCH to interchange the screen indexes, which in effect switches the two screens. The second screen becomes the first screen, and the first screen is free for generating a new screen. The result of this process is that each screen is processed as follows:

It is created by GENPAG, sent to the terminal by SNDPAG, edited by the user and transmitted back by GETPAG, and then written to the output file by WRTPAG. The interleaving allows the user to edit one page while another page is being created and checked for spelling by Micromark. When end of file is reached, GETPAG and WRTPAG are called to get the last screen and write it to the output file, and FINISH is called to terminate Micromark.

INITIALIZATION PROCEDURES

1. INITIAL

INITIAL first sets the screen width and initializes the input character pointer and the sentence index. It then clears the screen via subroutine CLEAR, displays a header and asks the user for the input file name via subroutine WRTVDT. The input file name is read by subroutine GETFIL and the file is opened. The first character is read into the input file buffer by subroutine RDCHAR. The output and error file names are generated from the input file name by changing the file name extension with subroutine SETEXT. Both of these files are opened and Micromark is put into spell mode by writing "$S" to the Micromark terminal.

2. GETFIL

Subroutine GETFIL reads a line from the terminal via RDVDT and finds the first and last non-blank characters in the line. If no non-blank characters are found, then the program is terminated. The line is then scanned for a colon (:). If no colon is found, then the name is stored in FILE preceded by "DO0:", otherwise the name alone is stored in FILE. When the name is stored in FILE, function LWCASE is used to determine whether the character is a lower case alphabetic character. If it is, then the upper case equivalent of the character is generated by function UCASE and is stored in place of the lower case character. A null terminator is appended and the procedure exits.

3. SETEXT

Subroutine SETEXT scans a file name for a period or a null terminator. If a period is found, it replaces what follows the period by the given three character extension. If a null is found, it appends a dot plus the three character extension. Then it appends a null terminator.

INPUT PROCEDURES

1. RDSENT

Subroutine RDSENT reads one sentence into the sentence buffer. It does this by calling RDWORD to read in a word and RDPNCT to read punctuation until a sentence terminator is found. Sentence terminators are periods, exclamation points, question marks, end of paragraph and end of file. When the sentence has been read, CHKWDS is called to check the spelling of the words in the sentence.

2. RDWORD

Subroutine RDWORD reads one word from the input file. It reads all characters into the sentence buffer until a non-word character is found (as determined by WRDCHR). If the last word character was a period it will return the character to the input buffer using subroutine RTNCHR. The starting position and length of the word are stored in WORDS and WRDLEN.

3. RDPNCT

Subroutine RDPNCT reads punctuation from the input file. If reads all characters into the sentence buffer until a non-punctuation character is found (as determined by PNCCHR). The starting position and length of the punctuation are stored in PUNCT and PNCLEN,

4. WRDCHR

Function WRDCHR determines if a character is a valid character to appear in a word by checking the corresponding location in a boolean table.

5. PNCCHR

Function PNCCHR determines if a character is a valid character to appear in punctuation by checking the corresponding location in a boolean table.

6. RDCHAR

Subroutine RDCHAR reads one character from the input file. If the input file buffer is empty, RDCHAR reads a new line into the buffer. If the new line is all blank or is null, it is replaced by a one character line containing an EOP (end of paragraph). RDCHAR then removes the character from the buffer. If the character removed is a control character (not including EOP), it skips characters until a non-control character is found.

7. RTNCHR

Subroutine RTNCHR returns the last character read to the input buffer. Since it is called immediately after the character is read, the character is already in the buffer. All that the routine needs to do is decrement the input buffer pointer.

SPELLING CHECKING PROCEDURES

1. CHKWDS

Subroutine CHKWDS is used to check the spelling of all the words of the sentence which is in the sentence buffer. It first calls CAPSOF, which changes capital letters to lower case letters in the first word of the sentence and in the beginning of quotes. It then calls CHKWRD for each word in the sentence. The first time CHKWRD is called, it is not asked to give a response. Each subsequent time CHKWRD is called, CHKWDS passes it a word and receives the response for the previous word. This process is called double buffering and it speeds the checking process by permitting the overlapping of concurrent synchronous processes. After the last word has been sent, CHKWRD is called one more time to get the response for the last word. When all words have been checked, CAPSON is called to change back the words which were changed by CAPSOF. If the last word of the sentence was followed by a period and it mas marked as incorrectly spelled, the word is checked again with a period appended. This is a test for abbreviations.

2. CAPSOF

Subroutine CAPSOF selectively changes upper case words to lower case words in the sentence buffer. It first finds the first word in the sentence whose length is not zero. If the first letter of the word is upper case (as determined by function UPCASE), then the letter is changed to lower case by function LCASE, and the element in the CAPS array is set to true to indicate the change has been made. Then the punctuation of the sentence is scanned for quote characters. If the word following the quote is upper case, then it is changed to lower case and CAPS is set accordingly,

3. CAPSON

Subroutine CAPSON changes non-capitalized words back to capitalized words. Those words which were changed by subroutine CAPSOF are changed. If the word was changed and received a "NO" response, then the word is checked again after it has been changed back to its original form.

4. CHKWRD

Subroutine CHKWRD checks the spelling of one word. If the flag passed to it is non-positive, then a word is passed for spelling checking. If the flag passed is non-negative, a response is returned. If a word is passed and its length is four letters or less, CHKSML is called to check the word's spelling. If the length is greater than four or it receives a "NO" from CHKSML, then it is passed to Micromark via MMSND. The answer buffer ANSBUF indicates whether the word received a "YES" from CHKSML or was passed to Micromark. When a response is required, CHKWRD checks the answer buffer. If the corresponding value is true, then it returns a true. If the ANSBUF value is false, then it calls MMRCV to receive a response from Micromark.

5. CHKSML

Subroutine CHKSML uses a hash table to check the spelling of a small set of short words (four characters or less). The 51 words in the hash table are among the most commonly used words in the English language and collectively make up 37 percent of the words used in average text. When called to check the spelling of a short words, it hashes the word using function HASH than checks the corresponding location in the hash table. If the word from the hash table matches the original word, then the word is correctly spelled. If not, then the word may be correctly spelled or it may be misspelled.

6. HASH

Function HASH hashes a word of four letters or less by summing the length of the words, the original of the first letter and the ordinal of the last letter. The ordinal of a letter is determined by function ORD.

7. ORD

Function ORD returns the ordinal of a character by using the character as the index to a table of ordinal values. The ordinal values have been chosen to give a high coverage (not necessarily maximum) of the most commonly used English words by function HASH.

8. MMSND

Subroutine MMSND blank fills words which are less than four characters long and writes them to the Micromark termimal.

9. MMRCV

Subroutine MMRCV reads a spelling response from the Micromark terminal.

PAGE GENERATION PROCEDURES

1. GENPAG

Subroutine GENPAG generates one screen from the input file. It first zeroes the screen index, the line length and the line counter. Then it repeatedly reads a sentemce via RDSENT and attempts to store it in the screen by calling STUFF. If an end of paragraph is reached, it calls ENDPAR to store the end of paragraph. When the sentence can not fit into the screen, it appends a terminating EOT and exits.

2. STUFF

Subroutine STUFF stuffs the sentence in the sentence buffer into a screen. For each word in the sentence buffer, it first checks if enough space remains on the current line to store the word and the punctuation which follows the word. If there is insufficient space then it puts a carriage return into the page with subroutine PUTCH. It then puts the word and the punctuation into the screen with subroutine PUTWRD. If the word is mispelled then the word is brackedted by start underline and stop underline characters.

3. PUTWRD

Subroutine PUTWRD copies a word into a screen and increments the screen index.

4. PUTCH

Subroutine PUTCH copies a character into a screen and increments the screen index.

5. ENDPAR

Subroutine ENDPAR writes an end of paragraph to a screen. If the current line is not null, it stores a carriage return into the screen to terminate the line. It then stores a carriage return to create a null line.

POST-EDITTING PROGRAMS

1. GETPAG

Subroutine GETPAG calls RCVPAG to get a screen from the terminal. If the screen is empty, it terminates Micromark and stops.

2. WRTPAG

Subroutine WRTPAG strips the editing marks from a screen and writes the screen to the output file via subroutine WRTCHR and writes the flagged words to the error file via subroutine ERRCHR.

3. WRTCHR

Subroutine WRTCHR writes a character to the output file. If accumulates characters until a carriage return is passed to it, then it writes the output line.

4. ERRCHR

Subroutine ERRCHR parses the stream of characters passed to it into words, writing each word to the error file on a separate line.

5. FINISH

Subroutine FINISH takes Micromark out of spell mode and displays a finish message on the terminal.

TERMINAL DRIVER PROCEDURES (VDTIO)

The terminal drivers are a set of MACRO routines which are used to drive a DELTA 5000 terminal in block mode under the RSZ-11D V6B operating system. Suitable replacements for these routines are necessary if this system is to use other operating systems or other block mode terminals.

1. WRTVDT

This routine transmits a line of characters to the terminal.

2. RDVDT

This routine receives a line of characters from the terminal. The remainder of the line, after the last typed character, is blank filled to 80 characters.

3. CLEAR

This routine clears the terminal screen.

4. SNDPAG

SNDPAG transmits the screen buffer VDTBUF to the terminal for display on the screen. The character immediately following the last character in the buffer to be displayed must be an EOT. The EOT is placed, by default, at the last position in the buffer.

5. RCVPAG

RCVPAG receives a screen of data from the terminal. The EOT character signals the end of transmission. The batch/background version of MICROMARK functions in much the same way as the interactive version. The text is input and marked by the same routines as in the interactive version.

UTILITY PROCEDURES

1. SWITCH

Subroutine SWITCH interchanges two integer values.

2. LCASE

Function LCASE maps upper case alphabetic characters into the corresponding lower case character.

3. LWCASE

Function LWCASE determines if a character is a lower case alphabetic character by checking the corresponding position in an array of boolean values.

4. UCASE

Function UCASE maps lower case alphabetic characters into the corresponding upper case character.

5. UPCASE

Function UPCASE determines if a character is an upper case alphabetic character by checking the corresponding position in an array of boolean values.

We claim:

1. A process for performing a set membership test by the technique of binary hash coding with allowable errors, comprising the steps of:
 a. receiving a source listing of a number of discrete items which define a set, and generating a number of representations for each of said items; and
 b. randomizing each of the number of representations through a hash step in order to yield a plurality of simple and randomly distributed hash address locations for each item of said set regardless of any variation in length for each item comprising the given set, wherein the number of address locations so generated is chosen as a function of the acceptable probability of an erroneous true when testing an item for membership; and
 c. storing a binary indicator (a single binary value, i.e., 0 to 1) at each of the plurality of hash address locations generated for each item of the set within a bulk storage memory device, without the ability to reconstruct the items of the set given the storage locations; and
 d. receiving a new item and examining said new item for set membership by repeating said generating and hashing steps upon said new item to thereby generate an equal number of new item hash address locations, and performing an AND operation upon all of the indicator values at said new item hash address locations to determine if there is a match with the set of previously stored indicators; and
 e. outputing whether there is or is not a match between all the indicators at the new item locations and the previously stored indicators defining the set.

2. A process according to claim 1 wherein the items defining the set are a vocabulary of self-contained alpha/numeric descriptors from a selected language, and the nubmer of the plurality of random hash address locations generated for each word is also chosen so that the randomizing hashing step will produce a density of stored address locations, in said bulk memory, which approximates 50% of the total bulk memory space available.

3. A process according to claims 1 or 2, wherein said step of generating a plurality of randomized address locations for each item further comprises the sub-process of choosing a fold width which is the length, in bits, of a desired hash value, wherein alternate fold width lengths within a bit representation of an item are thereafter combined by an "exclusive or" operation, in order to produce a resulting hash code indicator address location.

4. A process according to claim 3, wherein said step of generating a plurality of randomized address locations further comprises the subprocess step of choosing at least one flip width, wherein further each item is initially encoded into at least one bit string representation, and alternate intervals of a given flip width length of the resulting bit string representation are thereafter reversed, as part of said hashing step and prior to said "exclusive or" step, wherein said reversing step is alos repeated for alternate flip widths, to generate further of said plurality of randomized address locations for each item.

5. A process according to claim 4, wherein said step of generating a plurality of address locations also comprises the subprocess steps of initially producing a number of additional initial encodings in a mapping step and generating at least one further mapping which is the complement of said first mapping, whereby the randomness of address locations will be enhanced and, thereafter, performing the subprocess steps of reversing alternate bit string of each mapping for a length of the flip width, and then performing said "exclusive or" step.

6. A process according to claim 5, wherein the desired number of said plurality of address locations is determined by a subprocess step wherein each of a first number of initial mappings is operated upon by a second number of variable flip widths, whereby the number of address locations that are desired to be generated for each item is the product of the first and second numbers.

7. A process according to claim 1 wherein said function governing the number of address locations generated further comprises a size relationship between the number of available bits in the bulk memory (K), the number of items in the set (V), the number of said plurality hash values generated, for each word (H), and the density of bits to set in the memory (d), which is governed as follows:

$$d = 1 - \left(\frac{K-1}{K}\right)^{HV}$$

8. Apparatus for performing a set membership test by the technique of binary hash coding with allowable errors, wherein the set is represented by a plurality of binary indicators at randomly developed address locations within a bulk memory, wherein further there is no ability to reconstruct items of the set given any or all storage locations, said apparatus comprising:
   a. means for receiving a source listing of a number of discrete items which define a set and for generating randomized hash address locations which comprises a non-unique representation of said set, said generating means further comprising a hashing means adapted to operate upon each item of the set with a given number of hashing functions to thereby define a randomized, first plurality of address locations;
   b. means for storing an indicator at each of said first plurality of hash address locations generated for each item, wherein each such location is further defined by a bit set within a bulk memory; and
   c. means for receiving and examining a test item for set membership by using said hashing means to generate a second plurality of hash address locations by operating upon said test item with said same given number of hash functions; and
   d. AND means for indicating whether all of said second plurality of address locations are found defined within the set of said first plurality of address locations.

9. Apparatus according to claim 8 wherein said means for generating the first and second plurality of hash address locations comprises a hash board, said hash board further comprising:
   means for accepting a given bit string representation of an item and randomizing said bit string into an intial number of encodings by reversing at least one flip width length of said bit string; and
   means for dividing each bit string according to a fold width, and performing an "exclusive or" upon all fold widths in order to create one hash address location for each of said initial number of representations of a given initial bit string representation.

10. Apparatus according to claim 9, wherein said means for accepting and randomizing further comprises a flip multiplexor means, which is adapted to implement said minor fold width by initially storing the reversed bit strings in the proper sequence with a RAM, prior to said "exclusive or" step.

11. Apparatus according to either claim 9 or 10, wherein said means for creating the first and second plurality of hash address locations includes a plurality of registers for receiving bits representing a given character string, and including therewithin means for dividing the bits in a given flip width, with further means for incrementally accepting bits from said registers according to a count which is initialized to a fold width; and still further means to fold the resulting bits with respect to previous and subsequent fold width lengths, wherein there is also means to hold in memory a plurality of intermediate fold width lengths which are subsequently compared with an "exclusive or" logic operator to yield each of the plurality of hash address locations.

12. Apparatus according to claim 11, wherein said means for storing binary indicators at each of said first plurality of hash address locations includes a memory board comprising a number of random access registers of the charged coupled device (CCD) type, with means for initially accepting character strings, and further means for sequentially applying each of the plurality of hash functions to each and every string to develop the first plurality of hash address locations at which are to be set binary indicators within the CCD memory.

13. Apparatus for testing the spelling of an alpha/numeric word from a selected language, with allowable errors, through a set membership match, wherein a given vocabulary of correctly spelled words has been coded by binary hash coding and stored randomly within a bulk memory, said apparatus comprising:
   a. means for generating a first plurality of hash address locations for each of the words of said given vocabulary, and for randomizing the distribution of said locations throughout the available memory space of said bulk binary memory device;
   b. said randomizing means comprising table means for generating approximately five randomized initial representations of each word, and outputting each initial representation through a hash board;
   c. said hash board comprising means to randomize each received representation approximately four additional times, thereby producing approximately twenty randomized hash codes for each word in said vocabulary; and,
   d. means for inputting said approximately twenty hash code values for each vocabulary word as simple binary indicators into a bulk memory storage device to thereby set indicators at each one of said first plurality of hash address locations; and,
   e. means for receiving a test word sequentially generating a second plurality of approximately twenty hash address locations for said test word, which comprises means to sequential pass the test word to said table means and then to said hash board means; and, f. means for accepting said second plurality of hash address locations and for testing the values of those bits in said bulk memory at each of said second plurality of address locations with the logical operator AND, thereby to determine whether the indicators at all test locations are set, with further means for passing a positive indication if there is a match, otherwise passing a negative indication.

14. Apparatus according to claim 13, wherein said bulk memory is comprised of CCD re-circulating shift registers which form a multi-byte memory, and which is organized as a number of random access registers, wherein said CCD board further includes initialization means, comprising counters, wherein said means for testing said second plurality of hash address locations further comprises means to initially store more than one group of such address locations, for more than one test word, in a buffer memory, prior to accessing said CCD memory.

15. Apparatus according to either claims 13 or 14, wherein the size relationships between the number of bits in the CCD memory (K), the number of words in the vocabulary (V), the number of said plurality hash address locations generated, for each word (H), and the density of bits to be set in the memory (d), is governed as follows:

$$d = 1 - \left(\frac{K-1}{K}\right)^{HV}$$

* * * * *